US007072510B2

(12) United States Patent
Pettigrew

(10) Patent No.: US 7,072,510 B2
(45) Date of Patent: Jul. 4, 2006

(54) ADJUSTING DATA REPRESENTING IMAGE PIXEL COLOR

(75) Inventor: Daniel Pettigrew, Montreal (CA)

(73) Assignee: Autodesk Canada Co., Montreal (CA)

( * ) Notice: Subject to any disclaimer, the term of this patent is extended or adjusted under 35 U.S.C. 154(b) by 734 days.

(21) Appl. No.: 10/229,568

(22) Filed: Aug. 28, 2002

(65) Prior Publication Data

US 2003/0206665 A1 Nov. 6, 2003

(30) Foreign Application Priority Data

May 4, 2002 (GB) .................................. 0210279.6

(51) Int. Cl.
*G06K 9/00* (2006.01)
*G06K 9/36* (2006.01)

(52) U.S. Cl. ........................................ 382/167; 382/277
(58) Field of Classification Search ............... 382/131, 382/154, 162, 164, 165, 254, 276, 277, 284, 382/294, 305, 167; 345/161, 419, 473
See application file for complete search history.

(56) References Cited

U.S. PATENT DOCUMENTS

| | | | | |
|---|---|---|---|---|
| 5,771,043 A * | 6/1998 | Nigawara et al. | ........... | 345/419 |
| 5,854,634 A * | 12/1998 | Kroitor | ........................ | 345/473 |
| 6,104,402 A * | 8/2000 | Goddard et al. | ............. | 345/419 |
| 6,184,867 B1 * | 2/2001 | Kandogan et al. | .......... | 345/161 |
| 6,215,496 B1 * | 4/2001 | Szeliski et al. | ............. | 345/419 |
| 6,445,387 B1 * | 9/2002 | Choi et al. | .................. | 345/419 |
| 6,445,816 B1 * | 9/2002 | Pettigrew | ..................... | 382/162 |
| 6,751,347 B1 * | 6/2004 | Pettigrew et al. | ........... | 382/162 |
| 6,754,399 B1 * | 6/2004 | Pettigrew et al. | ........... | 382/276 |
| 6,898,309 B1 * | 5/2005 | Pettigrew et al. | ........... | 382/162 |
| 2003/0039405 A1 * | 2/2003 | Oosawa | ...................... | 382/294 |
| 2003/0190065 A1 * | 10/2003 | Hamill et al. | ............... | 382/131 |
| 2003/0206665 A1 * | 11/2003 | Pettigrew | ..................... | 382/284 |

* cited by examiner

*Primary Examiner*—Amir Alavi
(74) *Attorney, Agent, or Firm*—Gates & Cooper LLP

(57) ABSTRACT

A method, apparatus and programmed computer system provides the ability to process image data as picture screen elements having color components. A three-dimensional space is generated that represents a color spectrum containing the color conponents. A plurality of three-dimensional space transformation matrices are initiated and concatenated to initiate a single three-dimensional space transformation matrix. The plurality of three-dimensional space transformation matrices are populated in reply to user input data. The image data is adjusted by processing each of the color components with the single three-dimensional space transformation matrix.

28 Claims, 20 Drawing Sheets

$$\begin{bmatrix} E1 & E2 & E3 & E4 \\ E5 & E6 & E7 & E8 \\ E9 & E10 & E11 & E12 \\ E13 & E14 & E15 & E16 \end{bmatrix} \cdot \begin{bmatrix} R \\ G \\ B \\ 1 \end{bmatrix} = \begin{bmatrix} R' \\ G' \\ B' \\ 1 \end{bmatrix}$$

mTmp · Pixel = 605

603, 604, 605

Wherein:
R' = E1R + E5G + E9B + E13   ⏤ 1701
G' = E2R + E6G + E10B + E14  ⏤ 1702
B' = E3R + E7G + E11B + E15  ⏤ 1703
1 = E4 + E8 + E12 + E16      ⏤ 1704

*Figure 17*

ADJUSTING DATA REPRESENTING IMAGE PIXEL COLOR

CROSS-REFERENCE TO RELATED APPLICATION

This application claims the benefit under 35 U.S.C. Section 119 of the following co-pending and commonly-assigned patent application(s), which is incorporated by reference herein:

United Kingdom Application No. 02 10 279.6, filed May 4, 2002, by Autodesk Canada Inc., the assignee of the present invention, entitled "Processing Image Data."

FIELD OF THE INVENTION

The present invention relates to a method and apparatus for digitally compositing image data, wherein a foreground image requires blending with a background image by means of a compositing process in order to generate a composite image frame.

INTRODUCTION

Various processes for compositing image frame data have been known for some time. Technical advances in image processing systems have enabled the generalisation of the "blue screen" technique in video environments and "green screen" technique in cinematographic environments.

Typically, a talent is filmed in a studio configured with blue or green-saturated surroundings in order to generate a clip of foreground image frames. An alternative clip of background image frames is subsequently generated and a compositing process allows an editor to seamlessly blend the foreground and background image frames by means of keying part of the corresponding video signals, for instance the luminance or chrominance signals.

A problem however exists in traditional compositing processes, whereby foreground image clips may feature colour characteristics incompatible with the colour characteristics of their corresponding background image clips, for instance because the lighting conditions in the studio set were less than adequate at the time of recording said foreground image clips. Undesirable artefacts may result from this colour characteristics imbalance in the composited image frame, and techniques such as conventional colour suppression or colour saturation editing remedy the above problem by means of modifying the hue, luminance and chrominance characteristics of the colour components of picture screen elements of a frame.

Even when using modern post-production computer stations, however, the editing of colour component values according to the prior art remains a very resource-intensive and cumbersome process. A major problem with editing colour component values by means of colour suppression or colour saturation techniques is that such techniques modify all colours uniformly. For instance, suppression or saturation according to the known prior art respectively suppress or de-saturate red, green and blue colour components values by a same factor when only the green value of colour components within a frame should be edited. This problem results from sequentially applying the multiple algorithms necessary for colour-space transformations, to effect the colour component editing, to each and every pixel of a frame. Finally, the definition of the target hue is usually accomplished by means a two-dimensional hue component traditionally represented as a spline curve, which is very unintuitive.

A need therefore exists for an improved colour component value editing technique, which provides for unidirectional colour correction or saturation, is less resource-intensive and the working of which is more intuitive to a user.

BRIEF SUMMARY OF THE INVENTION

According to an aspect of the present invention, there is provided a method of processing image data comprising storage means, processing means and display means, wherein said storage means is configured to store image data as picture screen elements having colour components and said processing means is configured to perform the steps of generating a three-dimensional space representing a colour spectrum containing said colour components; initiating a plurality of three-dimensional space forward transformation matrices and at least one backward transformation matrix; concatenating said three-dimensional space transformation matrices to initiate a single three-dimensional space transformation matrix; populating said plurality of three-dimensional space transformation matrices in reply to user input data; and adjusting said image data by means of processing each of said colour components with said single three-dimensional space transformation matrix, wherein said backward transformation matrix omits the last forward transformation matrix applied.

In a preferred embodiment of the present invention, the colour components are Red, Green and Blue colour components and the three-dimensional space is preferably a colour-space.

In another preferred embodiment of the present invention, the plurality of three-dimensional space transformation matrices comprises forward transformation matrices and at least one backward transformation matrix. Preferably, the plurality of three-dimensional space transformation matrices are linear four integers-by-four integers transformation matrices and said plurality of three-dimensional space transformation matrices transform said three-dimensional space by means of translation, rotation, shearing, scaling or a combination thereof.

In yet another preferred embodiment of the present invention, the user input data comprises two-dimensional directional data and distance data and the populating step further comprises the step of processing said directional data and distance data to update integers within said three-dimensional space transformation matrices. Preferably, the updating of integers within said three-dimensional space transformation matrices updates integers within said single transformation matrix by way of concatenation.

In still another preferred embodiment of the present invention, the image data is adjusted by means of multiplying the colour components by the single three-dimensional space transformation matrix.

According to another aspect of the present invention, there is provided an apparatus for processing image data comprising storage means, processing means and display means, wherein said storage means is configured to store image data as picture screen elements having colour components and said processing means is configured to perform the steps of generating a three-dimensional space representing a colour spectrum containing said colour components; initiating three-dimensional space transformation matrices and concatenating said three-dimensional space transformation matrices to initiate a single three-dimensional space transformation matrix; populating said three-dimensional space transformation matrices in reply to user input; and adjusting said image data by means of processing each of said colour components with said single three-dimensional space transformation matrix.

According to yet another aspect of the present invention, there is provided a computer system programmed to process image data, including storage means, processing means and display means, wherein said storage means is configured to store image data as picture screen elements having colour components and said processing means is programmed to perform the processing steps of generating a three-dimensional space representing a colour spectrum containing said colour components; initiating three-dimensional space transformation matrices and concatenating said three-dimensional space transformation matrices to initiate a single three-dimensional space transformation matrix; populating said three-dimensional space transformation matrices in reply to user input; and adjusting said image data by means of processing each of said colour components with said single three-dimensional space transformation matrix.

According to still another aspect of the present invention, there is provided a computer readable medium having computer readable instructions executable by a computer, such that said computer performs the steps of storing image data as picture screen elements having colour components; generating a three-dimensional space representing a colour spectrum containing said colour components; initiating three-dimensional space transformation matrices and concatenating said three-dimensional space transformation matrices to initiate a single three-dimensional space transformation matrix; populating said three-dimensional space transformation matrices in reply to user input; and adjusting said image data by means of processing each of said colour components with said single three-dimensional space transformation matrix.

BRIEF DESCRIPTION OF THE SEVERAL VIEWS OF THE DRAWINGS

FIG. 17 further details the uniform transformation matrix according to the present invention;

BEST MODE FOR CARRYING OUT THE INVENTION

FIG. 1

Figure 1:
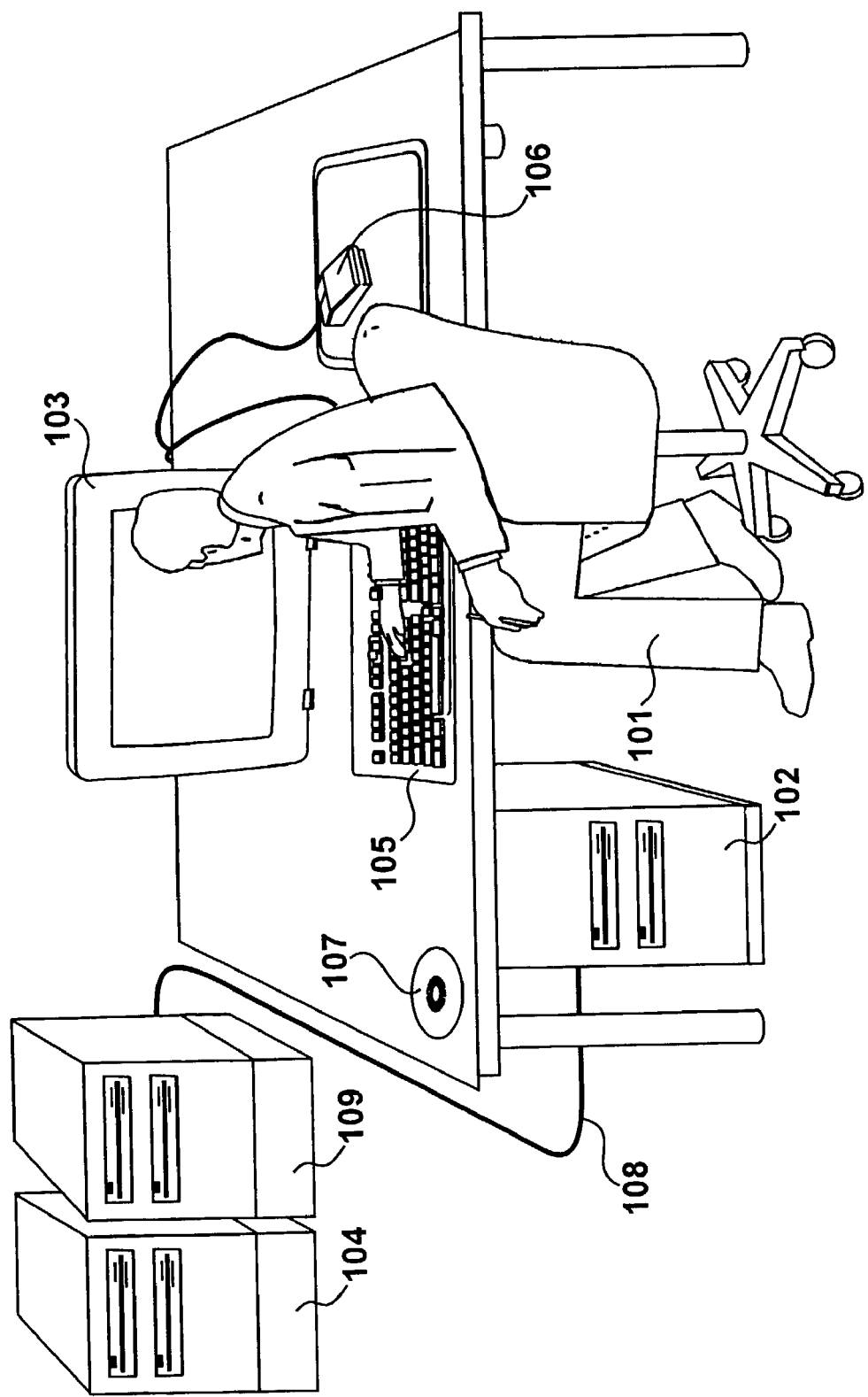
FIG. 1 shows an image processing system operated by an editor.

An image processing system such as a post-production station is illustrated in FIG. 1. A processing system 102, such as an Octane™ produced by Silicon Graphics Inc., supplies image signals to a video display unit 103. Moving image data is stored on a redundant array of inexpensive discs (RAID) 104. The RAID is configured in such a way as to store a large volume of data, and to supply this data at a high bandwidth, when required, to the processing system 102. The operator controls the processing environment formed by the processing system 102, the video monitor 103 and the RAID 104, by means of a keyboard 105, and a stylus-operated graphics tablet or a mouse 106. The processing system shown in FIG. 1 is optimal for the purpose of processing image and other high bandwidth data. In such a system, the instructions for controlling the processing system are complex. The invention relates to any computer system where processing instructions are of significant complexity.

Instructions controlling the processing system 102 may be installed from a physical medium such as a CDROM or DVD disk 107, or over a network 108, including the Internet. These instructions enable the processing system 102 to interpret user commands from the keyboard 105 and the graphics tablet 106, such that image data, and other data, may be viewed, edited and processed.

FIG. 2

Figure 2:
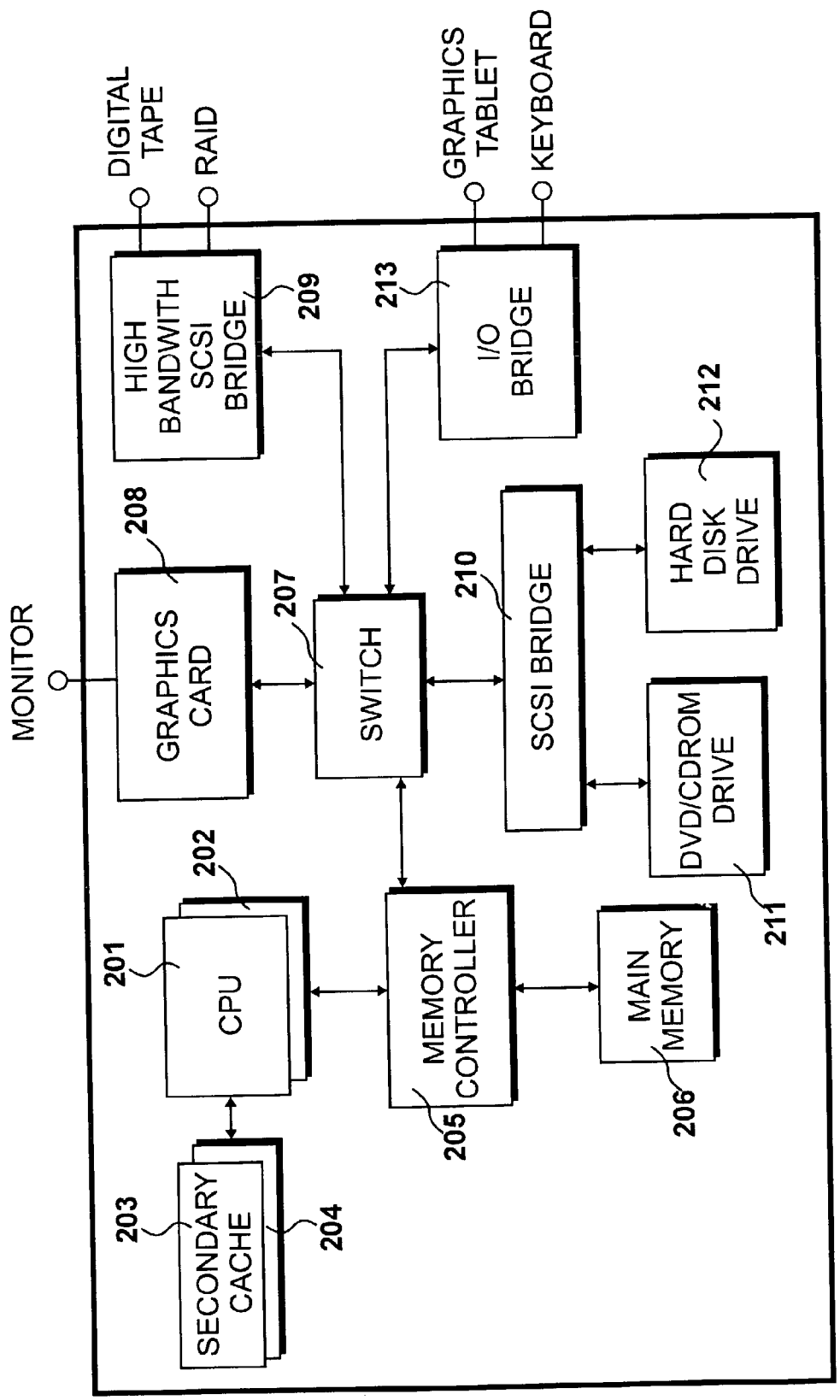
FIG. 2 details the hardware components of the image processing system of FIG. 1 in further detail.

The processing system 102 shown in FIG. 1 is detailed in FIG. 2. The processing system comprises two central processing units 201 and 202 operating in parallel. Each of these processors is a MIPS R11000 manufactured by MIPS Technologies Incorporated, of Mountain View, Calif. Each of these processors 201 and 202 has a dedicated secondary cache memory 203 and 204 that facilitate per-CPU storage of frequently used instructions and data. Each CPU 201 and 202 further includes separate primary instruction and data cache memory circuits on the same chip, thereby facilitating a further level of processing improvement. A memory controller 205 provides a common connection between the processors 201 and 202 and a main memory 206. The main memory 206 comprises two gigabytes of dynamic RAM.

The memory controller 205 further facilitates connectivity between the aforementioned components of the processing system 102 and a high bandwidth non-blocking crossbar switch 207. The switch makes it possible to provide a direct high capacity connection between any of several attached circuits. These include a graphics card 208. The graphics card 208 generally receives instructions from the processors 201 and 202 to perform various types of graphical image rendering processes, resulting in images, clips and scenes being rendered in real time on the monitor 102. A high bandwidth SCSI bridge 209 provides an interface to the RAID 104, and also, optionally, to a digital tape device, for use as backup.

A second SCSI bridge 210 facilitates connection between the crossbar switch 207 and a DVD/CDROM drive 211. The DVD drive provides a convenient way of receiving large quantities of instructions and data, and is typically used to install instructions for the processing system 101 onto a hard disk drive 212. Once installed, instructions located on the hard disk drive 212 may be fetched into main memory 206 and then executed by the processors 201 and 202. An input output (I/O) bridge 213 provides an interface for the graphics tablet 106 and the keyboard 105, through which the user is able to provide instructions to the processing system 102.

FIG. 3

A first foreground frame 301 consists of talent 302 filmed within a studio 303 configured as a blue saturated environment. In the example, talent 302 is filmed within a conventional room having a corner 304 where the colour intensity and saturation varies to a greater or lesser extent depending upon the lighting conditions prevalent within the said studio. Thus, there may exist important variations in the hue, intensity and saturation of a same blue colour within a two-dimensional image derived from a capture of a three-dimensional set 303.

Blue screen or green screen techniques well known to those skilled in the art are traditionally employed in order to replace the saturated background of studio 303 with artificial image data, which may consist of either a different set filmed at a different time or location, or computer generated image data, or a combination thereof. In the example, a producer wishes for talent 302 to be observing prestigious paintings by grand masters, which cannot be temporarily obtained for actual studio filming. A background image frame 305 is therefore computer generated and configured to include a room 306 substantially to the design and orientation of studio 303 and including photo compositions of paintings 307, 308 and 309 according to the script. The computer generated background room 306 includes a corner 310, a function of which will be to enable a user of image processing system 102 to accurately match the orientation and attitude of studio 303 and room 306, such that talent 302 in frame 301 will be correctly positioned relative to paintings 307, 308 and 309 within a composite image frame 311.

Figure 3:
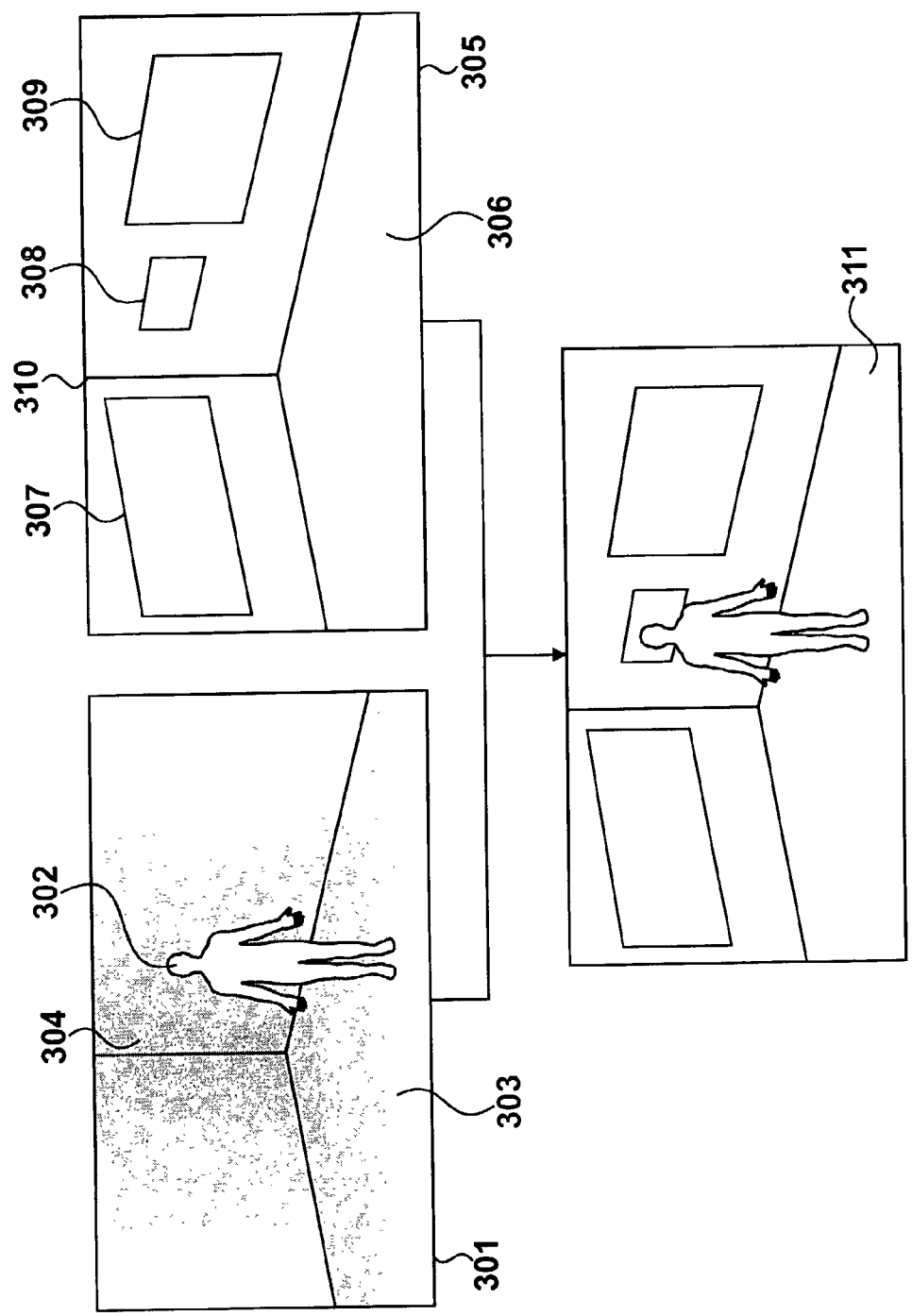
FIG. 3 shows a foreground image frame and a background image frame to be blended into a composite image frame.

The compositing post-production technique described in FIG. 3 is well known to those skilled in the art but features an important problem inherent to the fact that two independent image frames 301 and 305 from distinctly separate provenance must result in a composite image frame 311, which must be visually accurate and highly realistic. Whereas lighting conditions, either artificial in the case of a computer rendered background frame, such as frame 305 or real in the case of a filmed background frame, may be liberally adjusted at the time of creating said background frame inexpensively, the same adjustment of real lighting conditions in foreground frames such as image frame 301 can prove expensive as it may require multiple filming of the same scene under different lighting conditions. Thus, when talent 302 is composited within background frame 305 into a composite image frame 311, a lighting condition mismatch would result in the required level realism remaining unachievable, for instance because the artificial lighting within room 306 provides a warmer light (containing more red colour than green or blue) but the lighting within studio 303 is colder (containing more blue colour than red or green), especially with regard to the highly saturated blue background.

Figure 4:
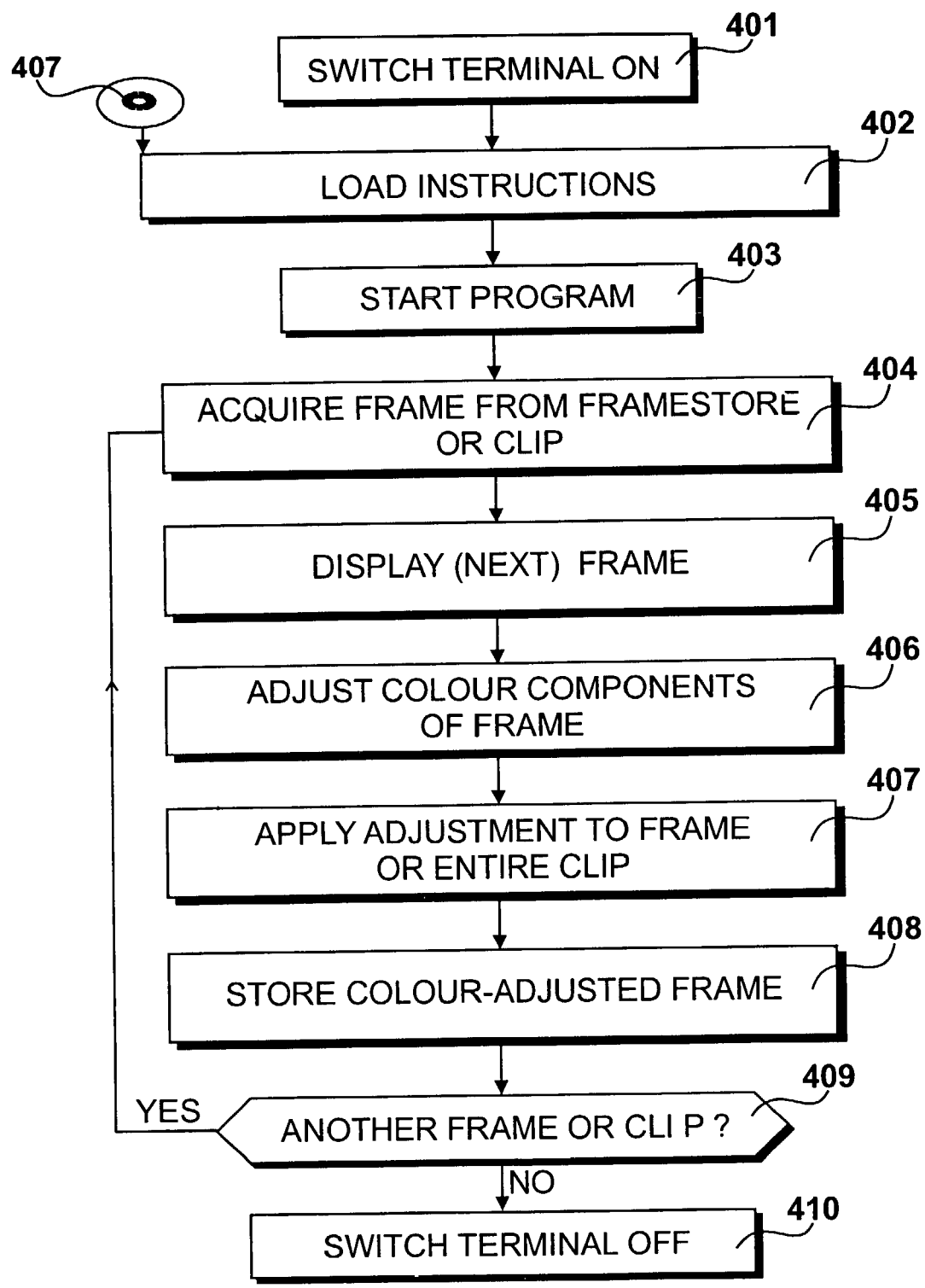
FIG. 4 details the operational steps according to which a user operates the image processing system of FIGS. 1 and 2 according to the invention.

The present invention enables user 101 to rapidly and intuitively adjust the colour components of the picture screen elements, known to those skilled in the art as pixels, of image frames such as foreground frame 301 in the example, with processing said pixels by means of instructions, the operational steps of which are shown in FIG. 4.

FIG. 4

Terminal 102 is switched on by user 101 at step 401, such that central processing unit instructions may be permanently loaded onto hard disk drive 212 or temporarily loaded within main memory 206 from CD ROM or DVD ROM 107, network server 109 or the Internet 108.

Upon completing the loading operation of step 402, the program is started at step 403, whereby the instructions thereof are processed by central processing units 201 and 202. At step 404, image data from a single frame such as foreground frame 301 or, alternatively, from a clip of frames is acquired from frame store 104 such that it can be displayed to user 101 on video display unit 103 at step 405.

Upon observing the frame displayed at step 405, user 101 is subsequently at liberty to adjust the colour components of the image data at step 406, whereby upon completing said colour component adjustment such that talent 302 realistically "blends" within artificial room 306, said adjustment is applied to the colour components of all of the pixels within the frame or alternatively, all of the pixels in each frame of the clip at step 407. Upon applying the adjustment of step 407, the frame or frames are stored with the colour-adjusted colour components of all of the pixels at step 408.

At step 409, a question is asked as to whether another image frame or clip of frames require processing by image processing system 102, whereby if answered in the affirmative, control is returned to step 404 such that a new frame or clip of frames can be acquired from frame store 104. Alternatively, if the question asked at step 409 is answered in the negative then user 101 is at liberty to switch the image processing system 102 off at step 410.

Figure 5:
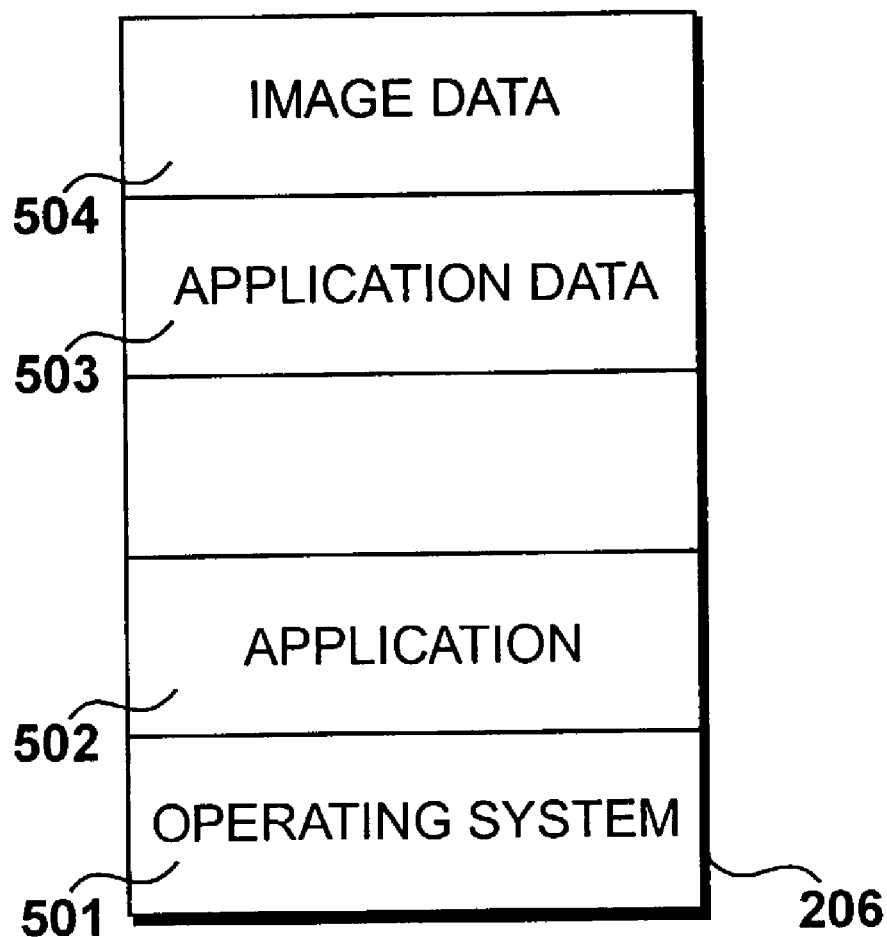
FIG. 5 shows the contents of the main memory as shown in FIG. 2 after the step of starting the programmes shown in FIG. 4.

The contents of main memory 206 subsequent to the instructions processing start of step 403 are further detailed in FIG. 5.

FIG. 5

An operating system is shown at 501 which comprises a reduced set of instructions for CPUs 201 and 202, the purpose of which is to provide image processing system 102 with basic functionality. Examples of basic functions include access to and management of files stored on hard disk drive 212, or DVD/CD ROM drive 211, network connectivity with frame store 104, server 109 and the Internet 108, interpretation and processing of the input from keyboard 105 and graphic tablet or mouse 106 and graphical data or binary data output. In the example, the operating system is IRIX™ provided by Silicon Graphics Inc, but it will be apparent to those skilled in the art that the instructions according to the present invention may be easily adapted to function under different other known operating systems, such as Windows™ provided by the Microsoft Corporation of Redmond, Calif. or LINUX which is freely distributed.

An application is shown at 502 which comprises the instructions loaded at step 402 that enable the image processing system 102 to perform steps 406 and 407 according to the invention within a specific graphical user interface displayed on VDU 103. Application data is shown at 503 and comprises various sets of user input dependent data and user input independent data according to which the application shown at 502 processes the image data, such as the pixel data of frame 301, shown at 504.

FIG. 6

Figure 6:
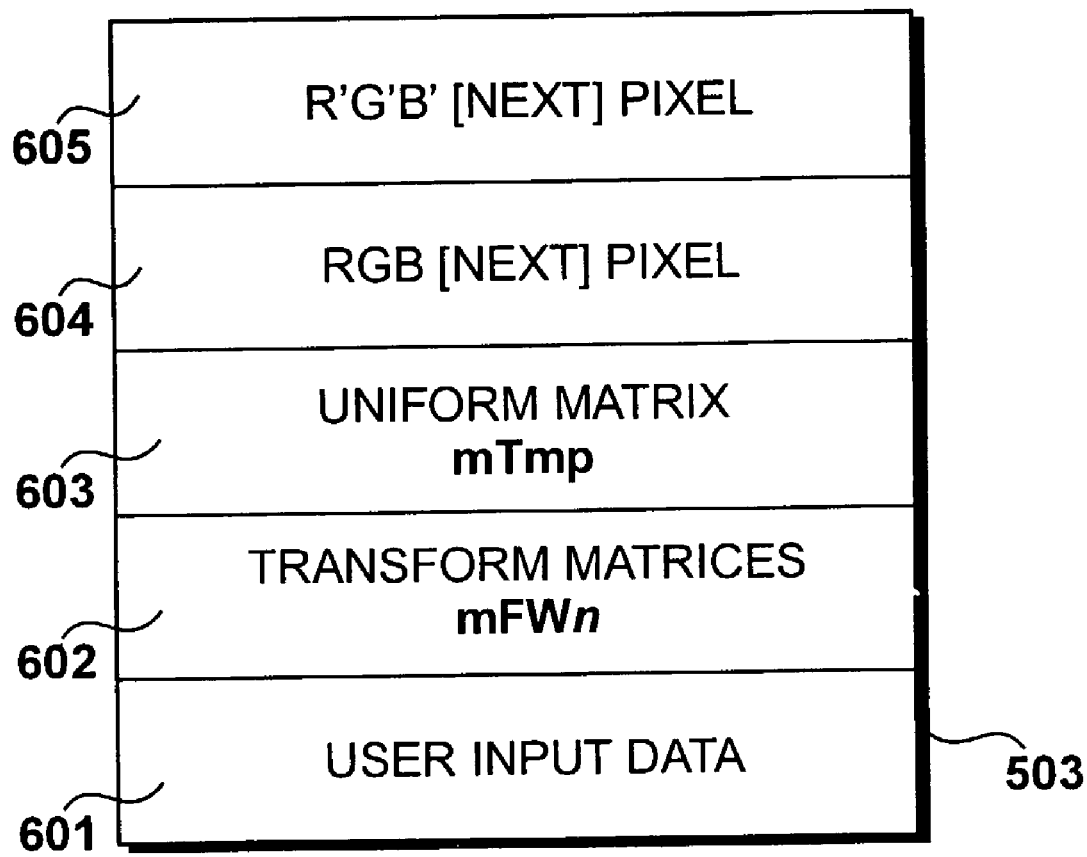
FIG. 6 further details the contents of the application data shown in FIG. 5.

The application data shown at 503 is further detailed in FIG. 6. User input data is shown at 601 which comprises data input by user 101 by means of keyboard 105 or a graphic tablet and stylus combination, or mouse 106 or a combination thereof and in a preferred embodiment of the present invention, primarily consist of two-dimensional coordinates of various interactive controls displayed within the application's graphical user interface and known to those skilled in the art as widgets. Transformation matrices mFWn are shown at 602, the concatenation of which results in a single uniform transformation matrix mTmp stored at 603 according to the invention. The matrices shown at 602 and 603 are four-by-four linear matrix transforms necessary to achieve colour-space conversions, the function of which will be detailed further below.

The respective red, green and blue colour component values of the pixels within the image data 301 once acquired at step 404 and displayed at step 405, are shown at 604 and their corresponding adjusted values R', G' and B' are shown at 605.

Figure 7:
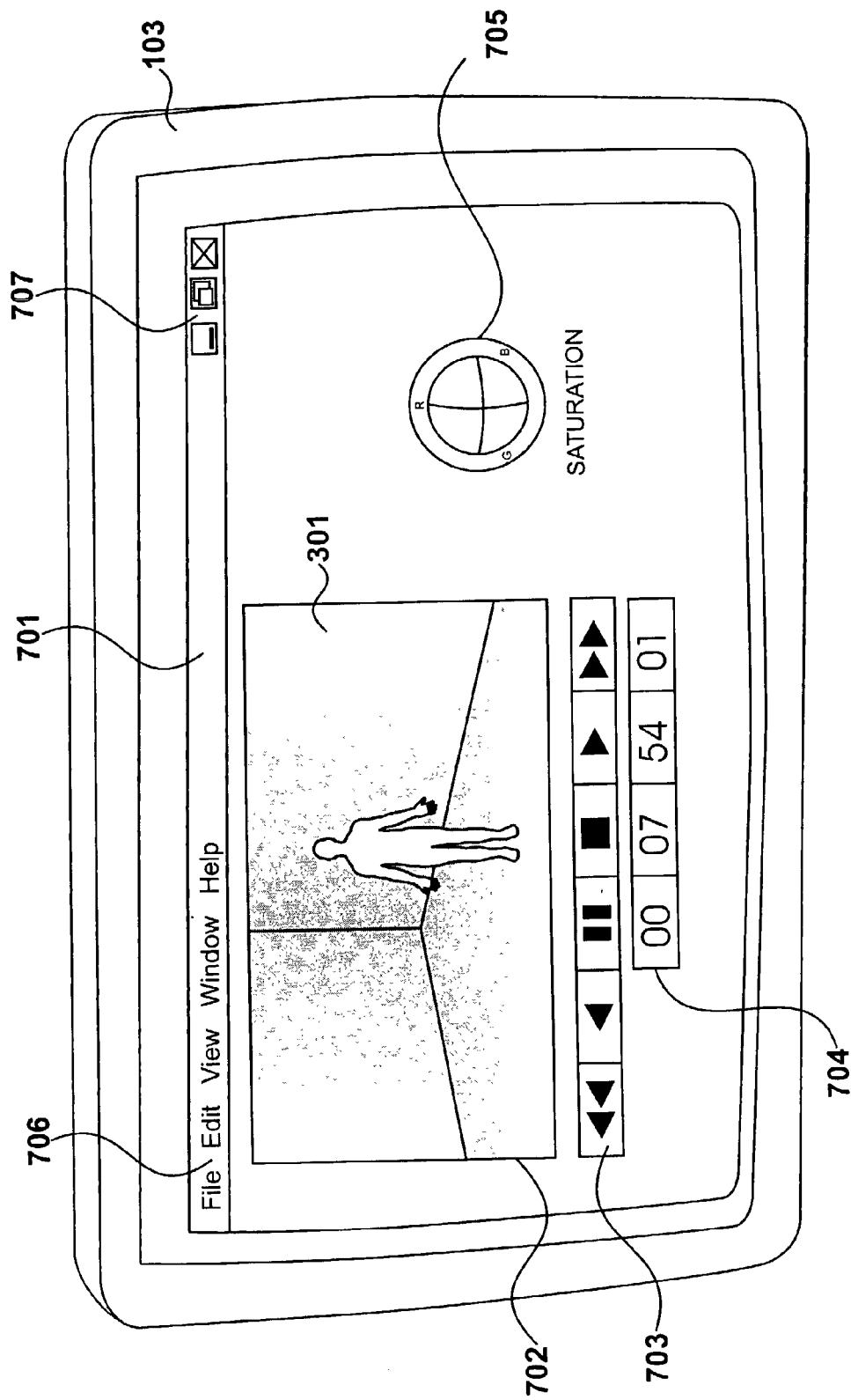
FIG. 7 is a representation of the graphical user interface of the application shown in FIG. 5 as displayed on the VDU shown in FIG. 1.

The graphical user interface of the application 502 within which colour component values 604 are selected and user input data 601 is generated is illustrated in FIG. 7.

FIG. 7

The video display unit 103 of image processing system 102 is shown as displaying the graphical user interface (GUI) 701 of application 502. GUI 701 is divided into a plurality of functional areas, portions of which are user-operable. A first area 702 displays image data acquired at step 404, according to step 405. A second area 703 comprises user-operable conventional clip navigation widgets allowing user 101 to rewind, backward play, pause, stop, forward play or fast-forward the sequential order of image frames within a clip if user 101 acquired a clip at step 404.

A counter area 704 is provided in close proximity to area 703 and divided into an hour counter, minute counter, seconds counter and frame counter, whereby said frame counter may operate in base twenty-four, base thirty or base sixty depending upon the provenance of the clip, eg respectively cinema, video or high definition TV. Said counter area 704 enables user 101 to accurately determine where the currently displayed frame 301 is located within the complete sequence of the clip.

A user-operable colour saturation widget 705 is also provided within GUI 701, the manipulation of which by user 101 via preferably but not exclusively, mouse 106 provides application 502 with the user input data 601 of application data 503. According to the present invention, the functionality provided by widget 705 allows user 101 to uniformly edit the respective value of either the red, green or blue colour component, or a proportional mix thereof defining a specific hue, in order to further saturate or inversely desaturate said specific colour, to the exclusion of any other colour in the image frame.

In another preferred embodiment of the present invention, widget 705 is a colour suppression widget, whereby its functionality allows user 101 to uniformly edit the respective value of either the red, green or blue colour component, or a proportional mix thereof defining a specific hue, in order to suppress said specific colour, to the exclusion of any other colour in the image frame.

A user-operable conventional bar 706 of menu commands is provided in the left uppermost area of GUI 701, which includes a plurality of shortcuts to facilitate frame or file access, application configuring and other such conventional application functions.

A user-operable conventional bar 707 of GUI sizing or application termination icons are provided in the right uppermost corner of 701.

Figure 8:
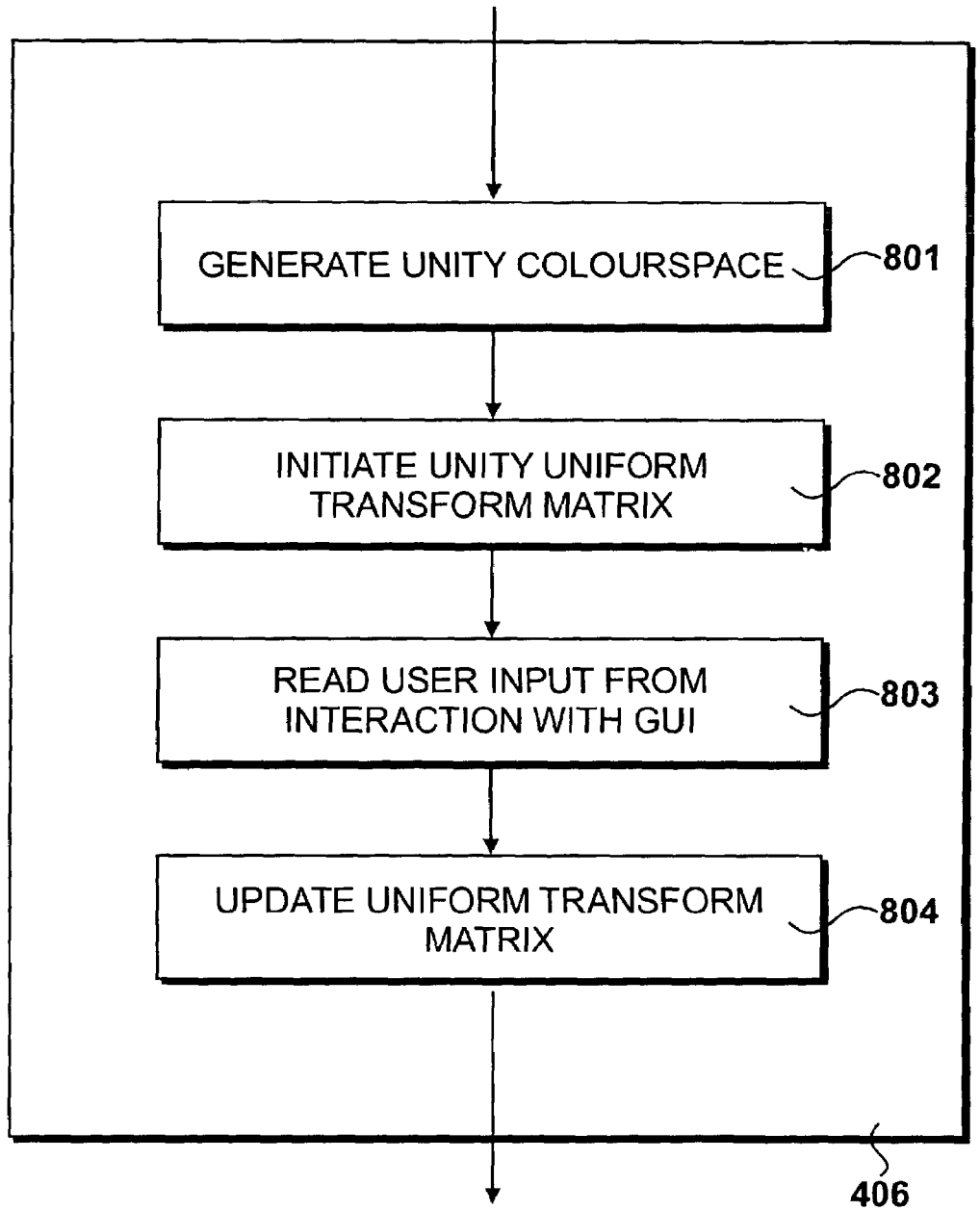
FIG. 8 details the operational steps according to which the image data is adjusted according to the present invention, including a step of generating an RGB colour-space.

In the example, user 101 acquires image data corresponding to foreground image frame from frame store 104 according to step 404, whereby image data 301 is displayed in display area 702 of GUI 701 according to step 405. User 101 may now adjust the RGB colour component values according to step 406, which is further detailed in FIG. 8.

FIG. 8

Figure 9:
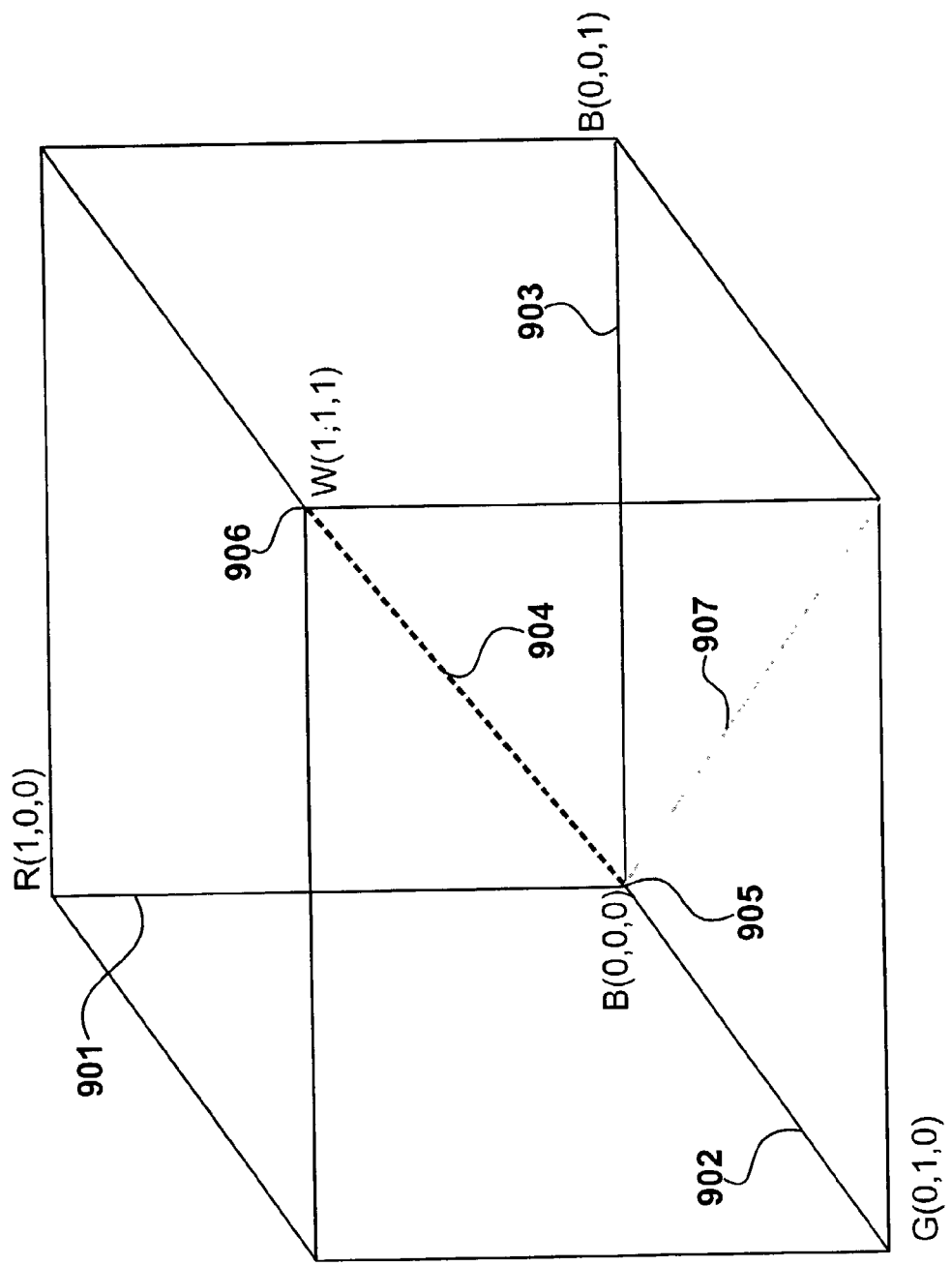
FIG. 9 shows a representation of the RGB colour-space generated at FIG. 8.

At step 801, a unity RGB colour-space is generated in relation to the RGB colour component values of the pixels defining the selected frame, which will be further described in FIG. 9 and is well known to those skilled in the art.

At step 802, a uniform transformation matrix is initiated according to the invention. The uniform transformation matrix is a four-by-four array of values and used to facilitate the movement of the selected pixel and hence eventually all the pixels of image data 301 from their original tri-stimulus values within a conventional RGB colour-space to alternate colour-space by means of inverting said matrix.

At step 803, user input data 601 is gathered from the interaction of user 101 with the mouse 106, the two-dimensional translation input data of which is processed by image processing system 102, whereby the uniform transformation matrix is gradually updated at step 804. Said two-dimensional translation input data may be further processed to impart a corresponding rotation to widget 705 in GUI 701, such that user 101 can intuitively appreciate the extent of the input.

The RGB colour-space generated at step 801, in relation to which the uniform transformation matrix is initiated at step 802, is further described in FIG. 9.

FIG. 9

RGB colour-space may be thought of as an RGB cube comprising a Red axis 901, a Green axis 902 and a Blue axis 903, each of which 20 extends between a minimum value of zero and a maximum value of one. For the purpose of clarity, an imaginary line 904 is shown that extends between minimum RGB (0,0,0) and maximum RGB (1,1,1), and is known as the luminance axis. For the purpose of clarity still, an imaginary shadow 907 is cast onto the base of the RGB colour-space in order to better appreciate the orientation of line 904.

Within the RGB colour-space, the position of a point on the surface of a disk centered on central luminance axis 904 and perpendicular to line 904 defines the hue and the saturation is the radius from said central intensity axis 904 to said hue. The hue is therefore expressed as an angle.

Figure 10:
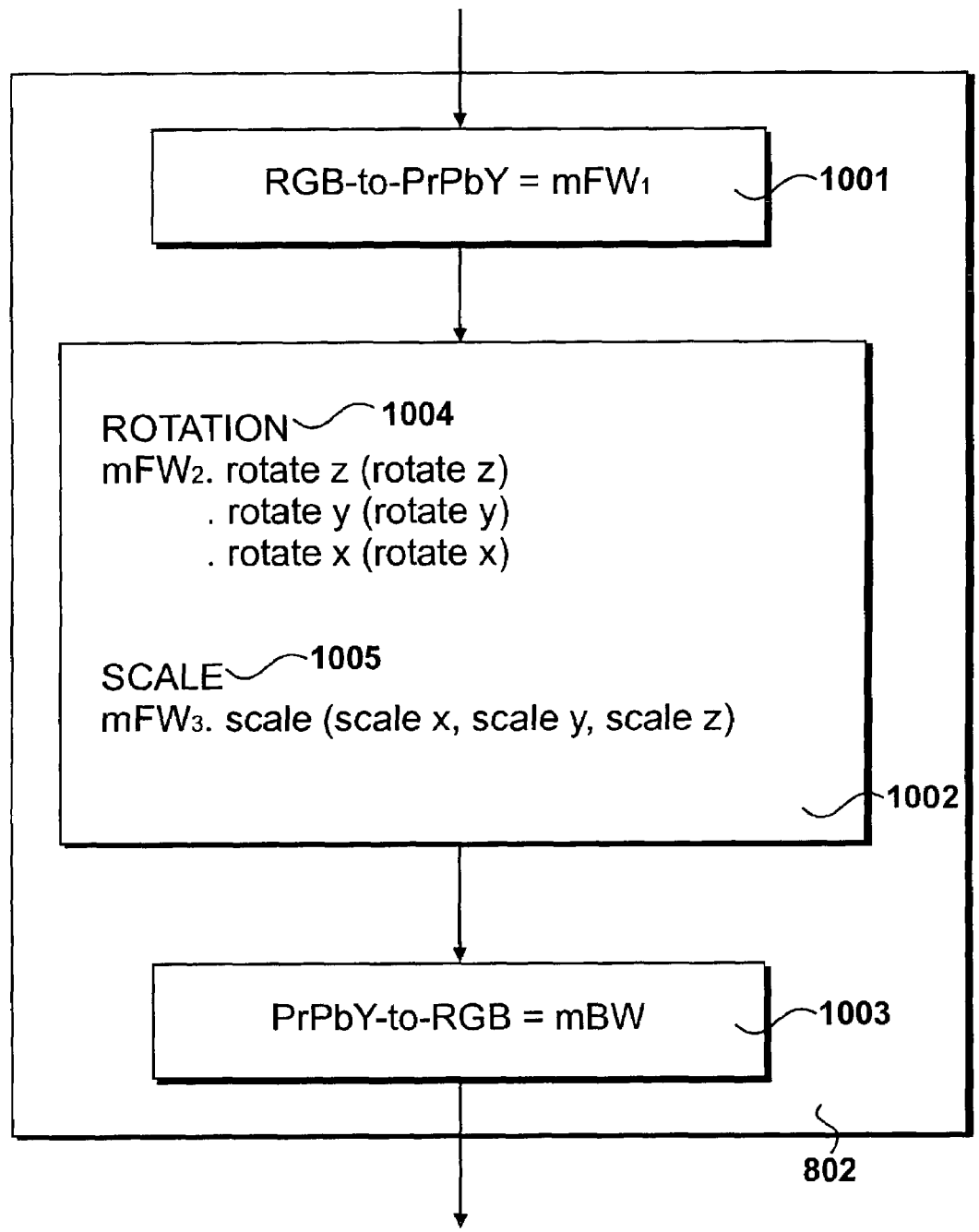
FIG. 10 details the operational steps according to which the RGB colour-space of FIGS. 8 and 9 is generated.

The operational steps according to which the uniform transformation matrix is initiated in relation to the RGB colour-space 901, 903 at step 802 are further detailed in FIG. 10.

FIG. 10

Technological advances in display technology have resulted in most of the VDUs employed for image compositing adopting a display signal to the HDTV format, and in the example VDU 103 is preferably HDTV-compliant such that a first forward transformation matrix mFW1 is generated at step 1001 to transform the RGB colour-space to a SMPTE-compliant YPbPr colour-space. SMPTE is an acronym which stands for Society of Motion Picture and Television Engineers. Traditional SMPTE provides a gamma corrected colour-space with RGB components, wherein the gamma value is 2.2 for the NTSC format and 2.8 for the PAL format but the SMPTE-240M of the example provides a gamma corrected colour-space with RGB components wherein the gamma value is 0.45. The colour-space provides three components Y, Pb and Pr respectively linked to luminancy and the Blue and Red components. The first forward transformation matrix mFW1 of step 1001 comprises a linear transformation step, as follows:

$$Red = (1 \times Y) + (0.0000 \times Pb) + (1.5748 \times Pr)$$

$$Green = (1 \times Y) - (0.1873 \times Pb) + (-0.4681 \times Pr)$$

$$Blue = (1 \times Y) + (1.8554 \times Pb) + (0.0000 \times Pr)$$

At step 1002, a plurality of four-by-four linear matrix transforms necessary to achieve colour-space conversion is initiated and stored at 602 within application data 503. In the preferred embodiment, said transformation matrices include a rotation forward transformation matrix mFW2 1004 and a scale forward transformation matrix mFW3 1005. It will however be readily apparent to those skilled in the art that many geometrical transformation matrices and combinations thereof may be used according to the present invention.

At step 1003, a backward transformation matrix mBW is initiated, which is the inverse of the forward transformation matrix mFW1 generated at step 1001 as transformed by forward transformation matrices mFW2 1004 and mFW3 1005, in order to transform the YPbPr colour-space back to RGB colour-space, whereby RGB components adjusted within an HDTV environment may be accurately updated within a device-independent colour-space. The backward transformation matrix of step 1002 comprises a linear transformation step, as follows:

$$Y = (0.2126 \times Red) + (0.7152 \times Green) + (0.0722 \times Blue)$$

$$Pb = (-0.1146 \times Red) - (0.3854 \times Green) + (0.5000 \times Blue)$$

$$Pr = (0.5000 \times Red) - (0.4542 \times Green) + (-0.0458 \times Blue)$$

In the preferred embodiment of the present invention, the above forward transformation matrices and backward transformation matrix initiated at steps 1001 to 1003 define the uniform transformation matrix mTmp 603 but it is useful to first describe the processing of said matrices for colour-space transformation according to the prior art. Such a description is provided in FIG. 11.

FIG. 11

Figure 11:
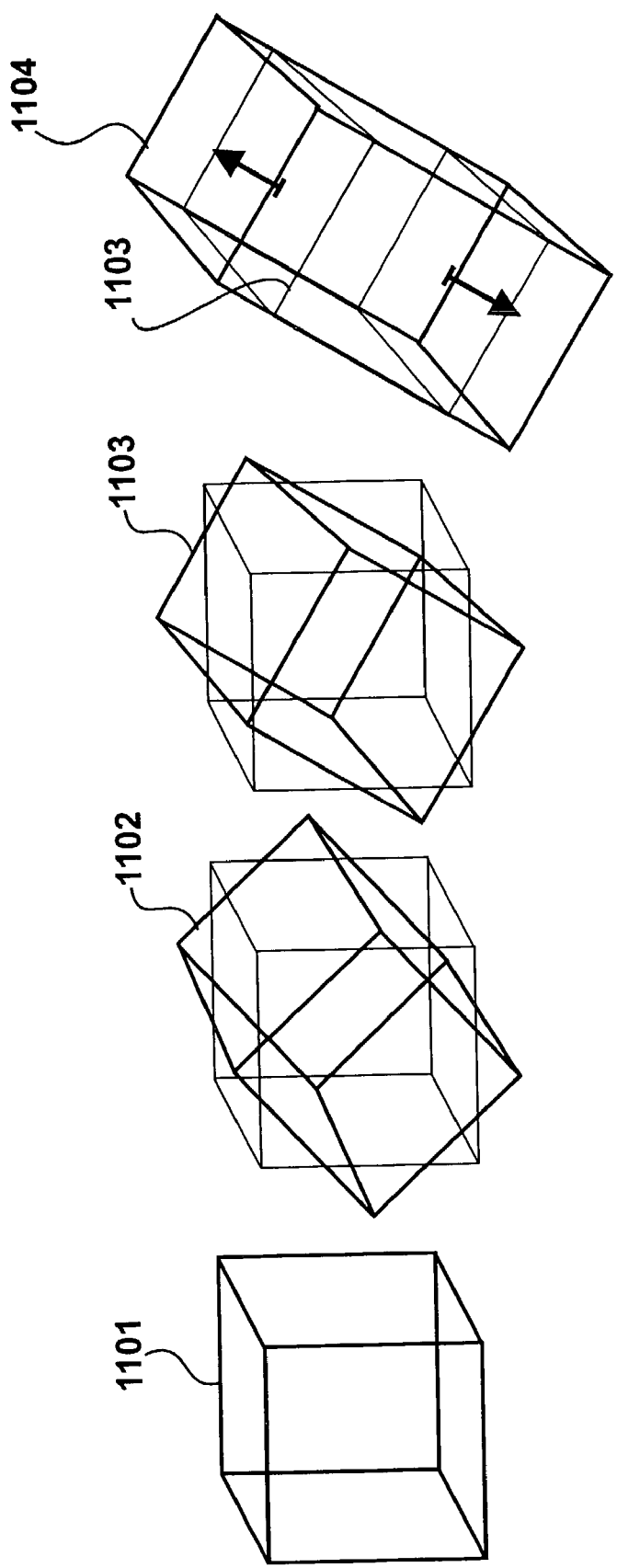
FIG. 11 shows a conventional transformation of an RGB colour-space according to the known prior art.

A conventional transformation of an RGB colour-space according to the known prior art is shown in FIG. 11.

A conventional RGB colour-space 1101 is shown in perspective and is submitted to a first forward transformation mFW1, comparable to the forward transformation matrix described herein in relation to process step 1001, such that a YPbPr colour-space 1102 is obtained.

It can be observed that the YPbPr colour-space 1102 is essentially a rotation of the RGB colour-space 1101, whereby the luminance axis 904 intersects the center of two opposite sides of the YPbPr colour-space 1102, a fact well known to those skilled in the art. In the example, if a user of the image processing system 102 configured to operate according to the known prior art wants to adjust the saturation of the colour components of the pixels constituting image frame 301, said user would input data to the extent that a second rotation forward transformation matrix and then a scaling forward transformation matrix are applied to the YPbPr colour-space 1102 in order to obtain an up-scaled YPbPr colour-space 1103.

The scaling forward transformation matrix applied to YPbPr colour-space 1102 to transform it into YPbPr colour-space 1103 is similar to the scaling forward transformation matrix mFW3 1005. Upon obtaining the most appropriate level of colour component value with editing the colour's saturation, the user ceases providing input data, whereby the transformed YPbPr colour-space 1103 is submitted to a backward transformation matrix similar to the backward transfer matrix mBW described herein in relation to process step 1103, in order to return an RGB colour-space, the colour components of the pixels of which are now adjusted.

The major drawback of colour saturation adjustment according to the prior art described thereabove, is that it is fully linear as can be easily seen from the successive pictorial representations shown in FIG. 11. Indeed, all of the colour component values of the pixels contained within RGB colour-space 1101 transformed into YPbPr colour-space 1102 are linearly scaled when said YPbPr colour-space 1102 is transformed into YPbPr colour-space 1103. Thus, the colour saturation adjustment of the prior art is uniformly applied to all of the colours contained within a frame.

Figure 12:
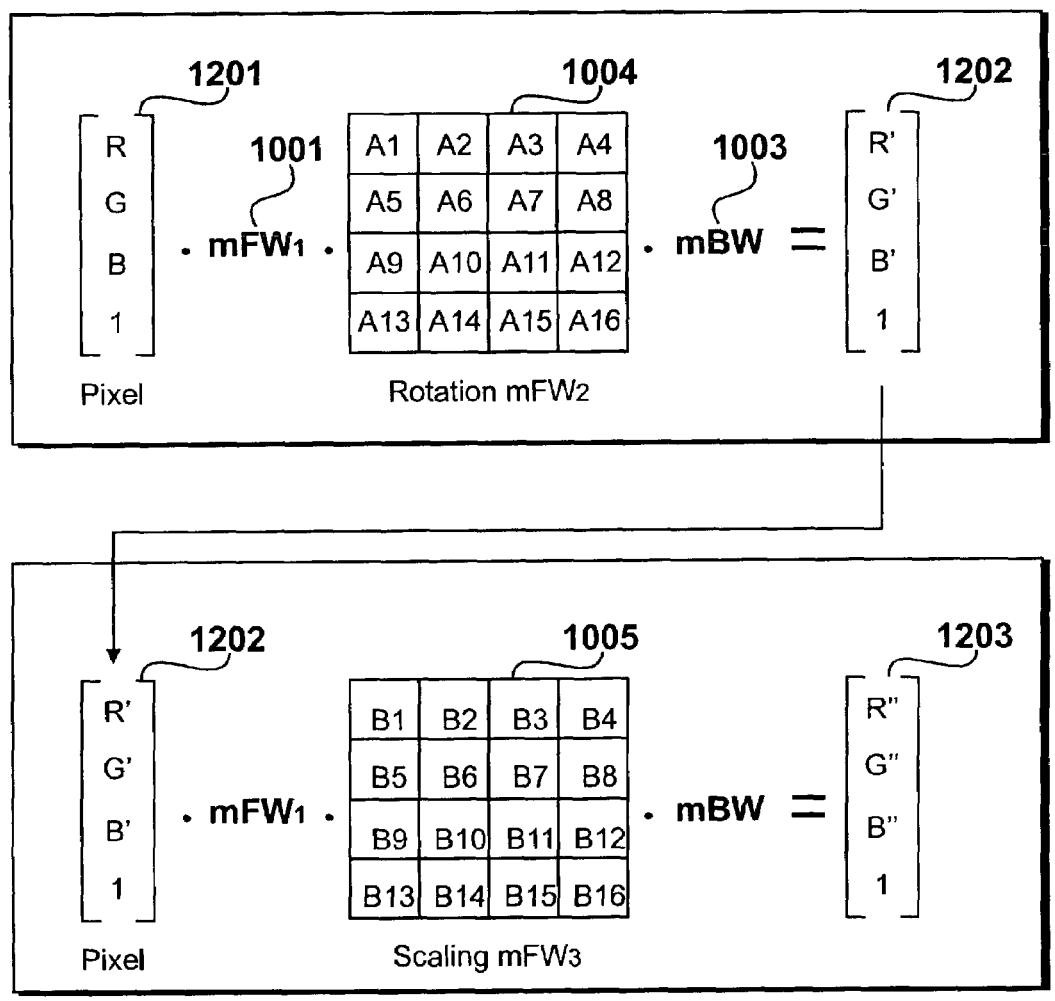
FIG. 12 details the iterative processing of the transformation matrices shown in FIGS. 10 and 11 for transforming the RGB colour-space shown in FIG. 11 according to the known prior art.

This important problem stems from the iterative nature of the processing steps required to transform colour-space according to the known prior art, an example of which is further detailed in FIG. 12.

FIG. 12

FIG. 12 illustrates the iterative processing steps according to which the colour-components 1201 of each pixel within a frame, such as frame 301, are processed so as to be adjusted to the satisfaction of user 101, using an image processing system 102 configured to process image data according to the prior art.

In this example, two different forward transformation matrices are required in order to satisfactorily adjust the colour component 1201 of each of said pixels as graphically shown in FIG. 11. For instance, a forward translation matrix, such as rotation forward transformation matrix mFW2 1004, must be applied to the second iteration of the YPbPr colour-space 1103 in order to generate first adjusted R', G' and B' colour components 1202.

Said first adjusted colour components 1202 subsequently require further adjustment, whereby a scaling forward transformation matrix, comparable to scaling forward transformation matrix mFW3 1005, is applied to a third iteration of the YPbPr colour-space derived from said adjusted colour components 1202 and second adjusted R", G" and B" colour components 1203 are eventually obtained.

As each successive forward transformation matrix is applied to each successive iteration of the RGB colour component data, said processing remains uniformly linear, because each successive transformation is based upon a YPbPr colour-space 1102 derived from an RGB colour-space 1101. Indeed, colour components 1201 are transformed into a first YPbPr colour-space 1102 to which a single forward transformation matrix 1004 is applied to generate second YPbPr colour-space 1103. First adjusted colour components 1202 are then transformed into a third YPbPr colour-space 1104 to which a single forward transformation matrix 1005 is applied to eventually generate final adjusted colour components 1203.

The present invention remedies the above problems with removing the linearity of the iterative processing steps shown in FIG. 12 with transforming the latest YPbPr colour-space iteration itself as opposed to the latest RGB colour-space derived from iteratively-adjusted colour components, in a series of colour-space transformations. A first conceptual representation of the above is shown in FIG. 13.

FIG. 13

The RGB colour-space 1101 is shown as transformed into first YPbPr colour-space 1102 and its subsequent transformation into YPbPr colour-space 1103 is also shown. According to the preferred embodiment of the present invention, however, the transformation of said YPbPr colour-space 1103 into scaled YPbPr colour-space 1301 is unidirectional.

Figure 13:
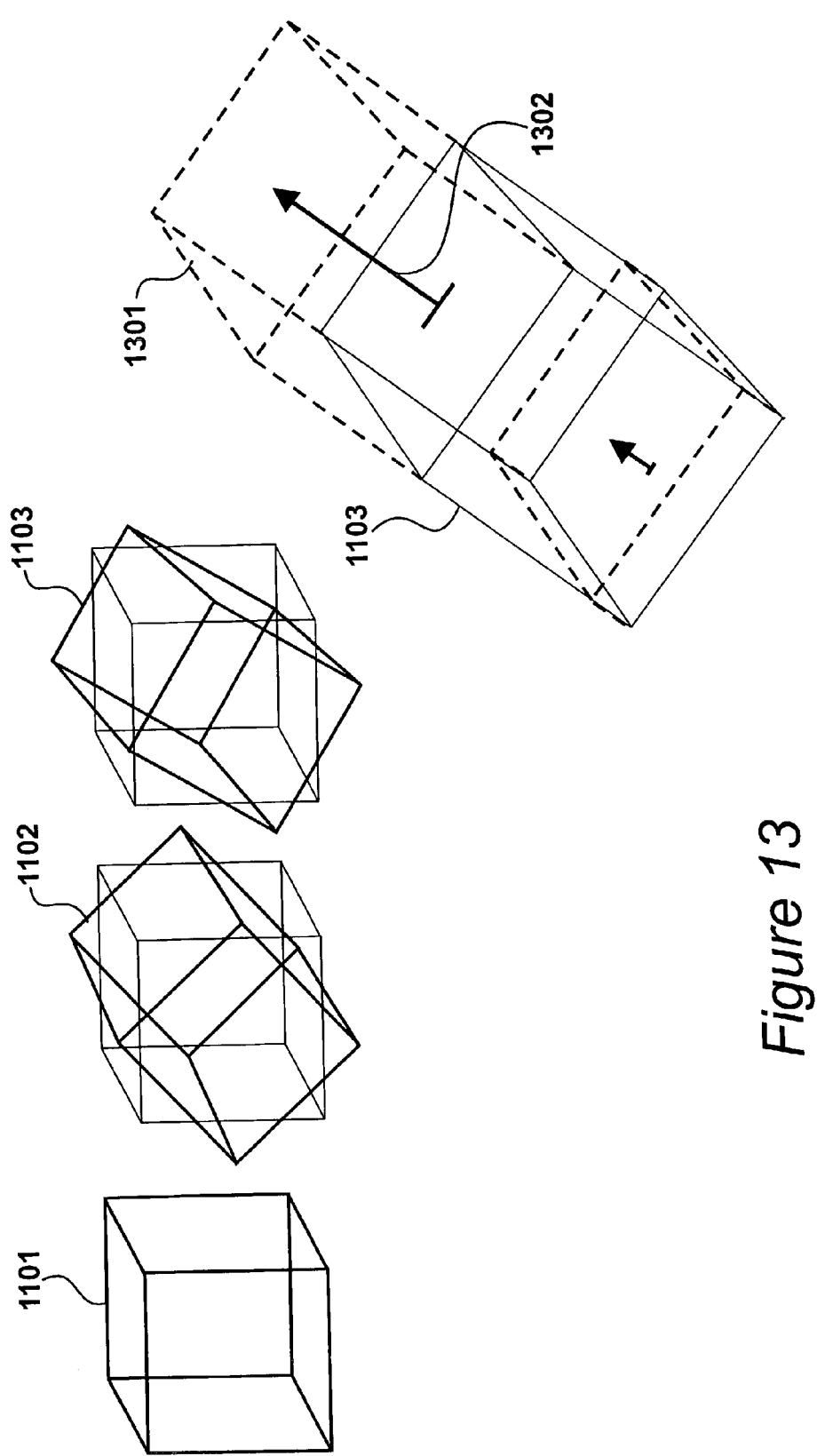
FIG. 13 shows a transformation of an RGB colour-space shown in FIGS. 9 and 11 according to the invention.

In the preferred embodiment of the present invention, the YPbPr colour-space 1102 shown in FIG. 13 is mapped to the colour-saturation widget 705 by means of a two-dimensional projection as follows:

Red=(1;0)

Green=[cos(120°);sin(120°)]=(−0.5; 0.866)

Blue=[cos(240°);sin(240°)]=(−0.5; −0.866)

whereby

Hue=[arctan2(x,y)]/(2×PI)

Saturation=$(x^2+y^2)^{1/2}$

Intensity=(Red+Green+Blue)/3 where x=(Red−0.5)×(Green+Blue)

y=0.866×(Green−Blue)

User 101 thus provides input data to image processing system 102 configured according to the invention by means of mouse 106 interacting with widget 705, according to step 803. Said user input data comprises two-dimensional X, Y co-ordinates provided by the uniplanar motion of mouse 106, the interpolation of which will be familiar to those skilled in the art, in accordance with the widget-mapping projection described thereabove.

Said interpolated two-dimensional input data may be expressed as directional data and distance data, wherein said direction data relates to the direction in which user 101 translates the relative centre of spherical widget 705, relative to its central, input-neutral starting position. Distance data relates to the extent to which user 101 moves said neutral centre from its relative origin.

Within the context of colour-space transformation, said direction data and distance data are processed by application 502 to define a transformation vector 1302, the orientation of which corresponds to said directional data and the length of which relates to said distance data.

To the contrary of the prior art, the colour-space transformation 1301 initiated by said user input data 601 constitutes a forward transformation matrix applied to YPbPr colour-space 1102 itself, as opposed to a subsequent single forward transformation matrix applied to a YPbPr colour-space representing first adjusted colour components 1202.

This result is achieved by initiating a plurality of transformation matrices mFWn 602 at unity according to step 802, and omitting the last forward transformation matrix from the processing of the backward transformation matrix calculation, and initiating the uniform transformation matrix mTmp 603 as a concatenation thereof. Said concatenation is conceptually shown in FIG. 14.

FIG. 14

The uniform transformation matrix mTmp 603 is obtained by concatenating the matrices stored at 602, which in the example include RGB-to-YPbPr forward transformation matrix mFW1 1001, the YPbPr colour-space forward transformation matrices mFW2 1004, mFW3 1005 and the backward transformation matrix mBW generated at step 1003, wherein said concatenation is a matrix multiplication such as shown at 1401.

The above colour-space transformation matrices are disclosed herein as a preferred embodiment of the present invention, but it will be apparent to those skilled in the art that any other three-by-three or four-by-four transformation matrix may be added or implemented in replacement thereof for concatenation to obtain the uniform transformation matrix according to the invention. For instance, certain applications may require a different first transformation of the RGB colour-space than YPbPr, such as YUV, which would thus require a different backward transformation matrix mBW than the mBW matrix herein disclosed. Alternatively, translation or shearing forward transformation matrices may be used in addition to or in replacement of the rotation and scaling matrices disclosed herein. The concatenating of the transformation matrices 602 with the uniform transformation matrix 603 operates according to traditional concatenating principles shown at 1401 and will be easily understood to those skilled in the art.

The calculation of a backward transformation matrix involves calculating the inverse of the forward transformation matrices applied to the RGB colour-space, whereby according to the prior art said inverse includes all of said applied forward transformation matrices, in effect arriving at the iterative process described in FIGS. 11 and 12. According to the invention, however, said calculation of the backward transformation matrix involves calculating the inverse of all the forward transformation matrices applied to the RGB colour-space except the last such forward transformation matrix applied, as shown at 1402, whereby said last such forward transformation matrix is applied to the YPbPr colour-space itself.

Thus, in the example, the unity RGB colour-space shown in FIG. 9 is first transformed to a YPbPr colour-space 1102 with matrix mFW1 1001, which is then rotated with matrix mFW2 1004 according to the direction data relating to the direction in which user 101 translates the relative centre of spherical widget 705, then further scaled with matrix mFW3 1005 and slightly translated with matrix 1006 according to the direction data relating to the extent to which user 101 moves said neutral centre from its relative origin. The backward transformation matrix at step 1003 subsequently omits calculating the inverse of said last applied matrix mFW3 1005.

FIG. 15

Figure 15:
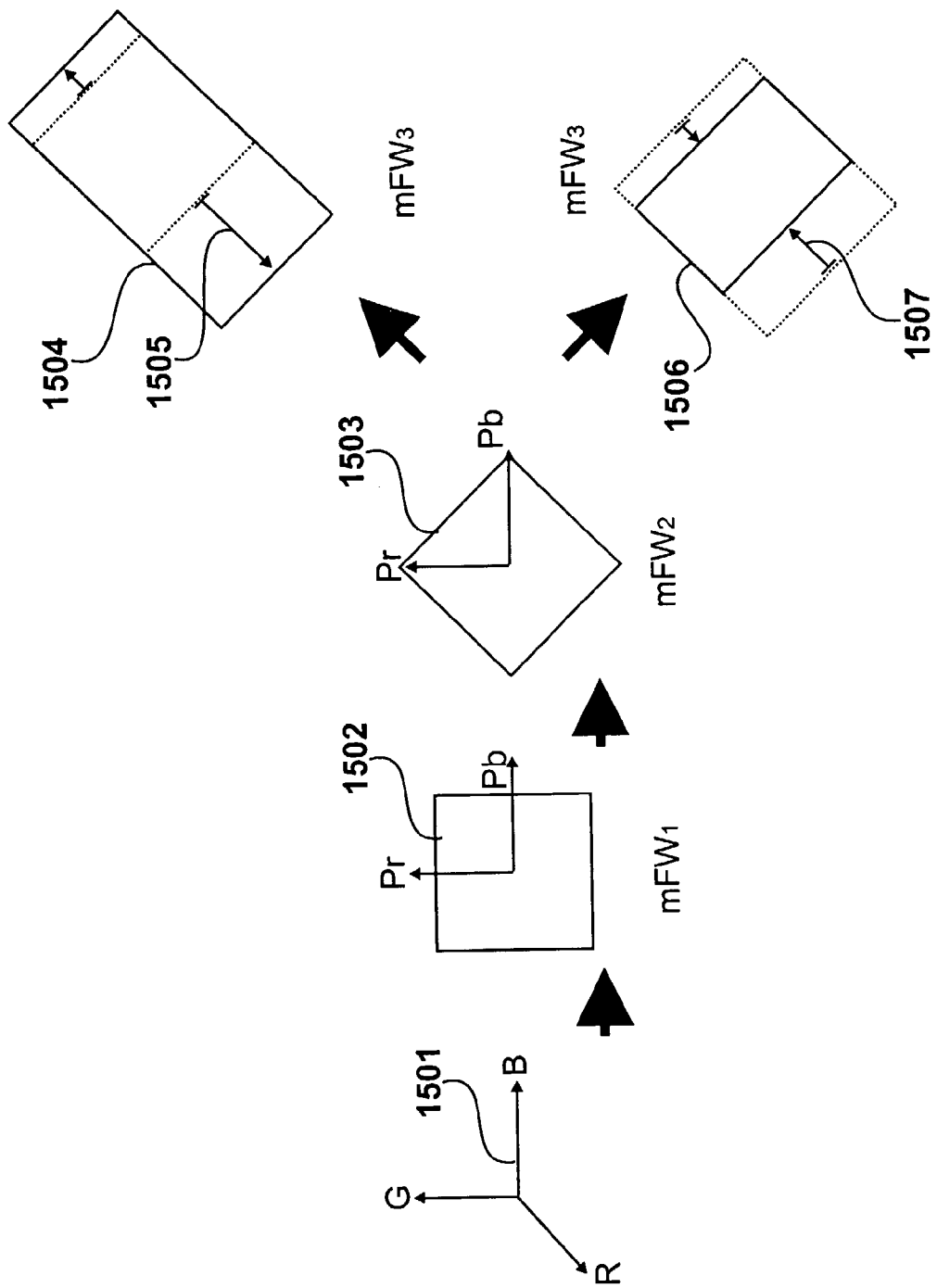
FIG. 15 provides a conceptual representation of both unidirectional colour suppression and unidirectional colour saturation according to the present invention.

FIG. 15 provides a conceptual representation in two dimensions of the transformation matrices 602 and backward matrix transformation applied as the uniform transformation matrix 603 to an RGB colour-space 1101 after initiation at unity according to step 802, e.g. concatenation 1401, 1402.

The RGB-to-YPbPr forward transformation matrix mFW1 1001 is initiated at unity, thus including neutral input data such that the uniform transformation matrix mTmp 603 does not amend the colour component values when processing RGB colour components 604. Initially, all other transformation matrices mFWn 602 are also initiated at unity, thus rotation matrix MFW2 1004 and scaling matrix mFW3 1005 are both initiated with unity data. Therefore, upon completing step 802 and before user 101 inputs any data which will be read according to step 803, the uniform transformation matrix mTmp 603 is populated with unity data, such that the colour components of each pixel within frame 301 remain unadjusted before said user input adjusts said colour components at step 406.

In the example, RGB colour-space 1501 is transformed into unity YPbPr colour-space 1502 by matrix mFW1 1001. Said unity YPbPr colour-space 1502 may now be transformed into adjusted Y'Pb'Pr' colour-space 1503 by matrix mFW2, whereby the process to this stage remains according to the prior art. Conventionally, adjusted Y'Pb'Pr' colour-space 1503 would now be transformed back to adjusted R'G'B' colour components 1202, e.g. an R'G'B' colour-space, to be again transformed into unity Y"Pb"Pr" colour-space by matrix mFW1 1001 before another transformation by matrix mFW3 1005, since all forward transformation matrices 1001, 1004 and 1005 are inversed by mBW.

However, according to the present invention, the adjusted Y'Pb'Pr' colour-space 1503 is not yet transformed back into adjusted R'G'B' colour components 1202, but is beforehand transformed by scaling matrix mFW3 1005 into adjusted Y"Pb"Pr" colour-space 1504 because said scaling matrix mFW3 1005 is not subsequently inversed by mBW when transforming back to adjusted R'G'B' colour components 1202. In the example, said adjusted Y'Pb'Pr' colour-space 1503 is transformed into adjusted Y"Pb"Pr" colour-space 1504 to adjust colour saturation, whereby it is unidirectionally scaled in the direction 1505 of a particular colour, e.g. only the colour components defining said particular colour are increased for saturation or decreased for de-saturation.

In an alternative embodiment of the present invention wherein said widget 705 is a colour correction widget, said adjusted Y'Pb'Pr' colour-space 1503 is transformed into adjusted Y"Pb"Pr" colour-space 1506 to suppress colour, whereby it is unidirectionally scaled in the direction 1507 of a particular colour, e.g. only the colour components defining said particular colour are increased for colour addition or decreased for colour suppression.

FIG. 16

It was previously explained that colour-space transformation vector 1301 comprises two-dimensional X, Y data, which is read at step 803. The processing of said directional data in order to update the uniform transformation matrix mTmp 603 at step 804 is further detailed in FIG. 16.

At step 1601, a question is asked as to whether application 502 has received an input signal to the effect that widget 705 has been interacted with such that a direction and distance now exist between the relative origin and the current position of the neutral centre of said widget 705. If the question asked at step 1601 is answered negatively, there is no requirement to update the integers of the transformation matrices 602, thus of the uniform transform matrix 603, whereby control is directed to step 1606 and colour component values remain unaffected after processing by matrix 603 populated with neutral input data.

If the question asked at step 1601 is answered positively, however, user input data 601 is interpolated and processed to populate the transformation matrices 602 respectively invoked to effect the required colour suppression. In the example, the portion of user input data 601 comprising the directional data is interpolated and processed to populate rotation matrix MFW2 1004 at step 1602 and the portion of user input data 601 comprising the distance data is interpolated and processed to populate scaling matrix MFW3 1005 at step 1603.

At step 1604, a second question is asked as to whether application 502 has received new user input data 601 to the effect that new directional data has been received, i.e. the angle between the last position the notional neutral centre of widget 705 and the current position thereof has changed. If the question asked at step 1604 is answered positively, control is returned to step 1602 whereby said new distance data is interpolated and processed to repopulate the rotation matrix MFW2 1004.

Alternatively, question 1604 is answered negatively, whereby a third question is asked at step 1605, as to whether application 502 has received new user input data 601 to the effect that new distance data has been received, i.e. the radial position between the last position the notional neutral centre of widget 705 and the current position thereof has changed. If the question asked at step 1605 is answered positively, control is returned to step 1603 whereby said new distance data is interpolated and processed to repopulate the scaling matrix MFW3 1005.

Figure 14:
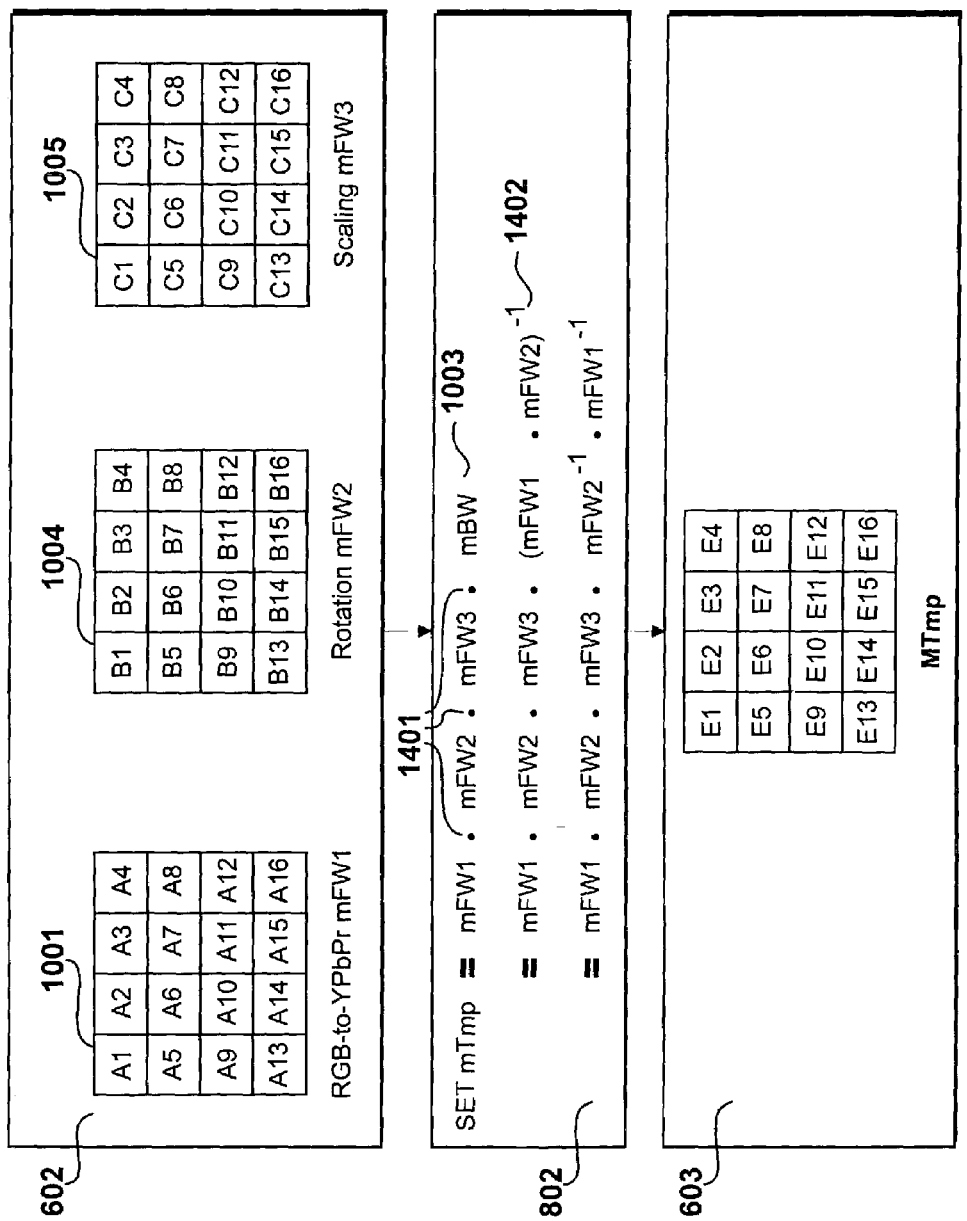
FIG. 14 details the concatenation of the transformation matrices shown in FIGS. 10 and 13 into the uniform transformation matrix according to the present invention for transforming the RGB colour-space shown in FIG. 13.

Alternatively, if the question at step 1605 is answered negatively, the backward transformation matrix mBW is calculated from all of the populated forward transformation matrices at step 1605, according to the invention as shown in FIG. 14.

Finally, at step 1606, the uniform transformation matrix mTmp 603 is calculated by concatenating all of the populated transformation matrices 602, including the backward transformation matrix calculated at step 1605.

FIG. 17

Figure 16:
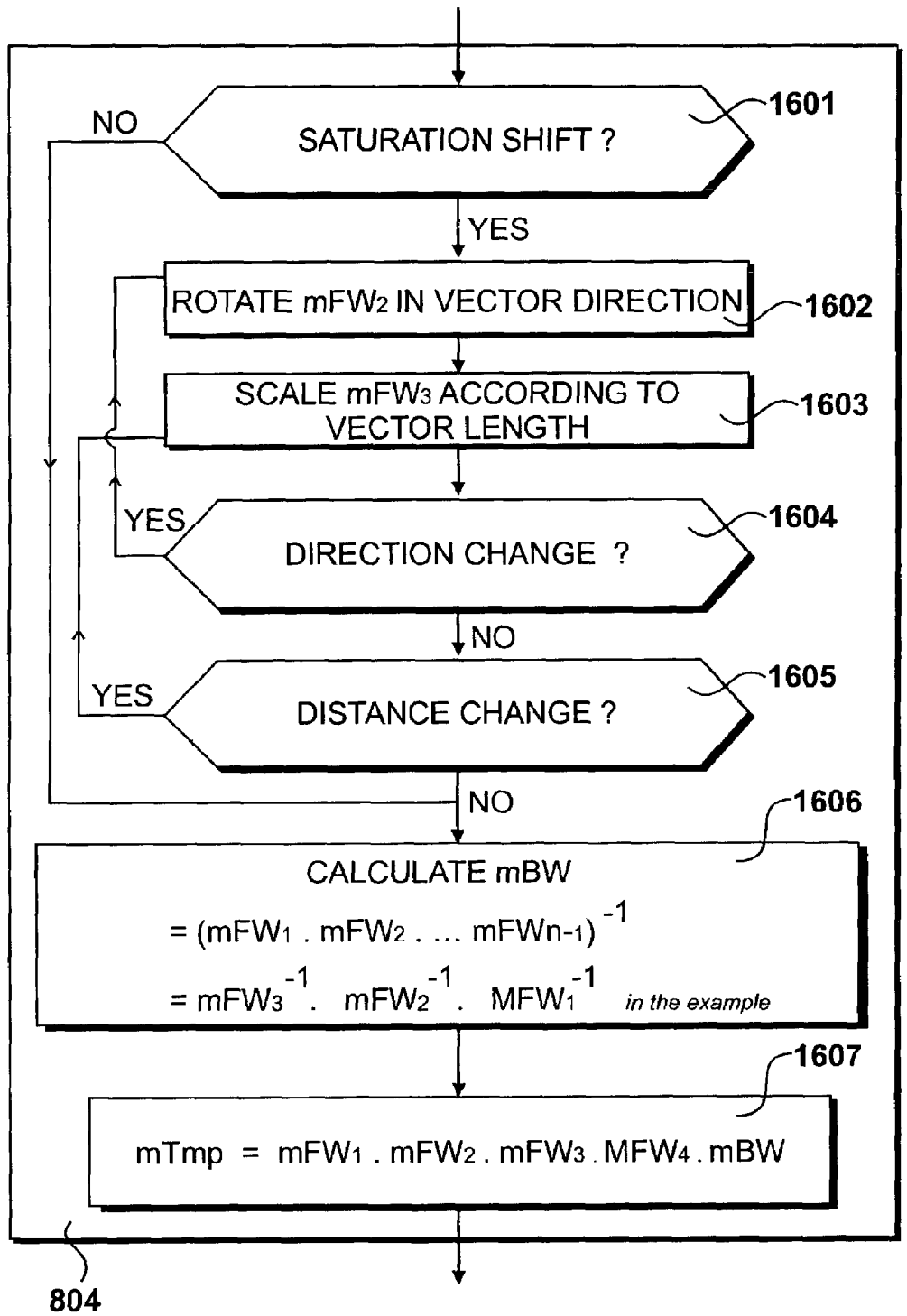
FIG. 16 details the processing steps to update the uniform transformation matrix shown in FIG. 14.

Upon completing the concatenation of step 1606 as shown in FIGS. 14 and 16, the final uniform transformation matrix 603 according to the invention enables image processing system 102 to adjust the colour components 604 of every pixel of frame 301, with minimal use of processing resources and thus much more rapidly than colour-adjustment processes, e.g. colour suppression or saturation, according to the known prior art.

According to the invention, the adjusted colour components R'G'B' 605 of each pixel of frame 301 are simply obtained by multiplying the RGB colour components 604 of each pixel by the RGB uniform transformation matrix 603 according to the known rules of matrix multiplication. Thus for instance:

$R' = E1 \times R + E5 \times G + E9 \times B + E13$ as shown at 1701;

$G' = E2 \times R + E6 \times G + E10 \times B + E14$ as shown at 1702;

$B' = E3 \times R + E6 \times G + E11 \times B + E15$ as shown at 1703;

In the preferred embodiment of the present invention, matrix integers E4, E8, E12 and E16 are control values, the sum of which always equals 1. Thus for instance:

1=*E*4+*E*8+*E*12+*E*16 as shown at 1704;

FIG. 18

Figure 18:
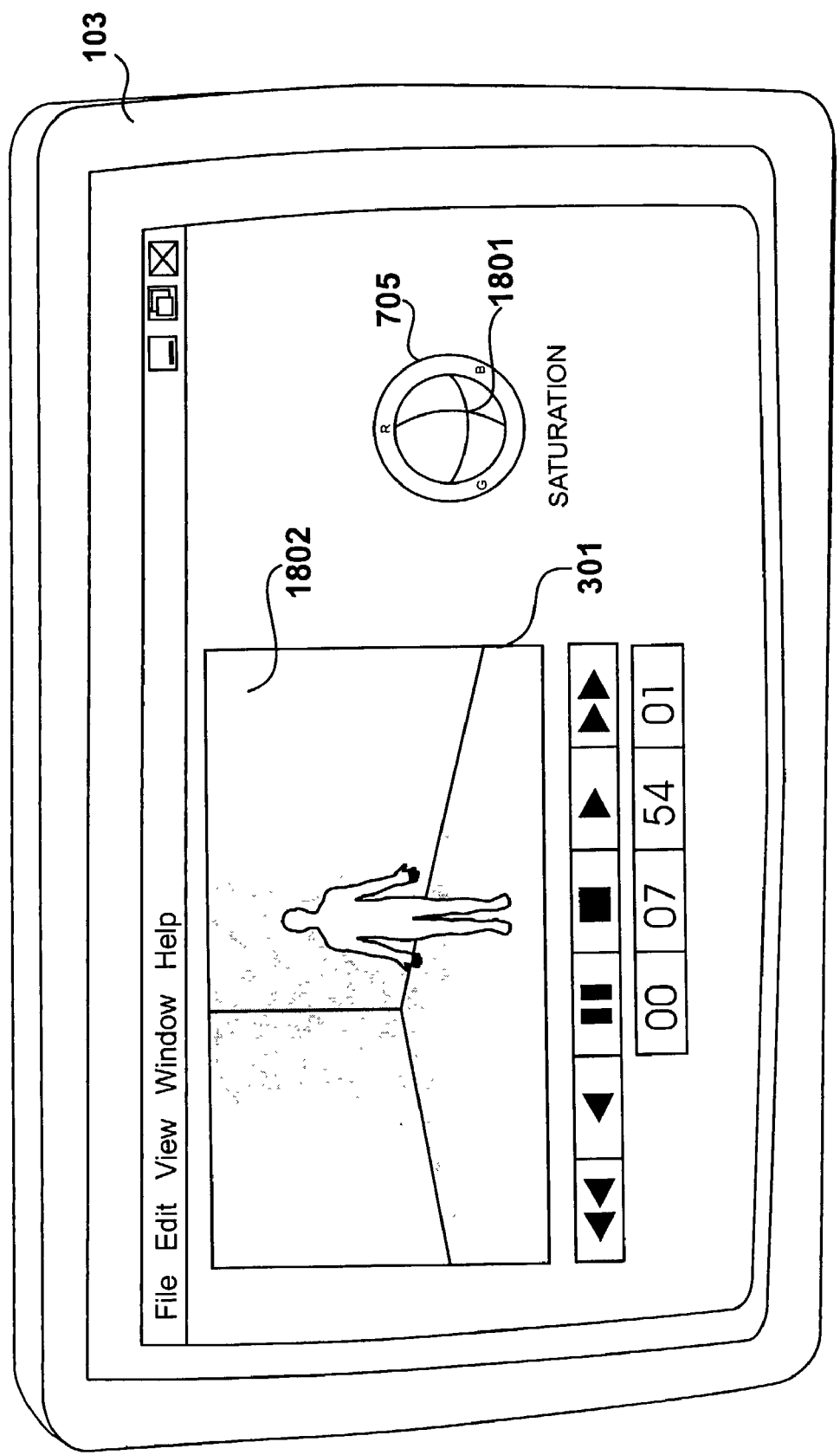
FIG. 18 shows the GUI of FIG. 7, whereby user input data is provided to modify image data according to the present invention.
Figure 19:
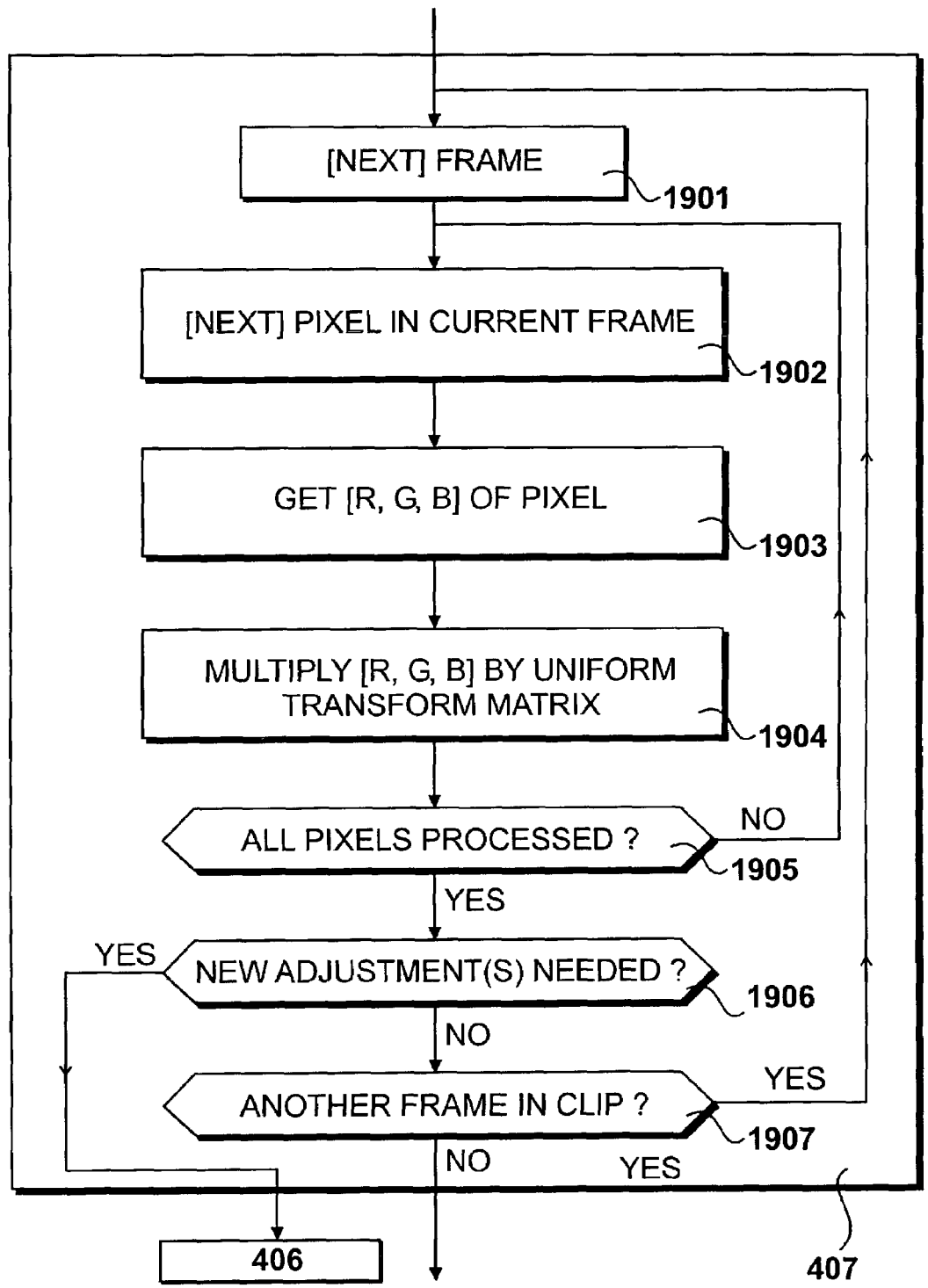
FIG. 19 details the operational steps according to which the image data as shown in FIGS. 3 and 7 is processed by means of the uniform transformation matrix.

The GUI 701 of the compositing application 502 shown in FIG. 7 is now shown in FIG. 18, wherein the user 101 of image processing system 102 inputs colour component adjustments by mean of colour saturation widget 705. As previously explained, the uniform transformation matrix mTmp 603 initiated at step 802 in relation to the RGB colour-space can be updated from the simple interaction between user 101 and the colour saturation widget 705 within GUI 701, wherein user 101 is in effect directly transforming the YPbPr colour-space shown in FIG. 13.

In the example, user 101 determines that there exists a colour component imbalance between the foreground image frame 301 and the proposed background image frame 305 to be composited therewith. The imbalance arises from the configuration of the studio set having a corner 304, wherein the colour intensity and saturation of the blue background darkens in proximity of said corner. In order to successfully composite background image frame 305 within foreground image frame 301, it is desirable to de-saturate the "blue" colour component of the walls and ground surface of the studio in order to obtain as uniform a "blue" colour as possible for image keying purposes, i.e. decrease the saturation of the "blue" colour only, but retain the current saturation of the "green" and "red" colours.

According to the invention, user 101 can intuitively interact with image processing system 102 to decrease the saturation of the "blue" colour component only within the colour components of image frame pixels representing the studio blue background in image frame 301 by moving the nominal neutral centre of widget 705 towards the representation 1801 of the blue colour within said widget.

The image processing 102 updates the RGB colour components of every pixel of image frame 301 within display area 702 in real time as the uniform transformation matrix 603 is generated as soon as user 101 selects a frame, such as frame 301. Any subsequent interaction with colour widget 705 results in the corresponding adjustment of uniform matrix integers E1 to E16 such that adjusted RGB colour components are output for every such interaction. Eventually, a colour corrected foreground frame 1802 is obtained, within which the respective RGB colour components of the pixels representing the blue background of the studio sets are uniform enough to remove the possibility of artefacts derived from light imbalance or talent lighting mismatch when compositing background image frame 305 therewith.

FIG. 19

The operational steps according to which the adjustment carried out at step 406 are applied at step 407 to the image data of image frame 301 as shown in display area 702 in FIG. 7 and subsequently in FIG. 18, are further detailed in FIG. 25.

At step 1901, application 502 selects the current frame or, alternatively, if a clip of image frames was required at step 404, the next frame in said clip. At step 1902, the first pixel in the frame selected at step 1901 is selected and thereafter every next pixel in said current frame until all pixels have been selected and subsequently processed.

At step 1902, the RGB colour components 604 of the pixels selected at step 1902 are read such that they may be subjected to a matrix multiplication with the uniform transformation matrix 603 at step 1904.

A question is asked at step 1905 as to whether all pixels in the current frame have been processed. If the question is answered negatively, control is returned to step 1902, whereby the next pixel is selected and so on and so forth. Alternatively, question 1905 is answered negatively and a further question 1906 is asked as to whether the colour component adjustment of step 406 require refining. If question 1906 is answered positively, control is returned to step 406, whereby said frame is displayed with adjusted colour components R', G', B' within display area 702 such that user 101 may further interact with colour saturation widget 705.

If question 1906 is answered negatively, however, a final question 1907 is asked as to whether there remains another frame to be processed in the clip, if a clip was acquired at step 404. If question 1907 is answered positively, control is returned to step 1901, whereby the next frame in the clip is selected for colour component adjustment according to the invention or, in another preferred embodiment of the present invention, for immediate processing with the current uniform transformation matrix 603. Alternatively, question 1907 is answered negatively, whereby the current frame is stored with adjusted R', G' and B' colour component values according to step 408.

FIG. 20

Figure 20:
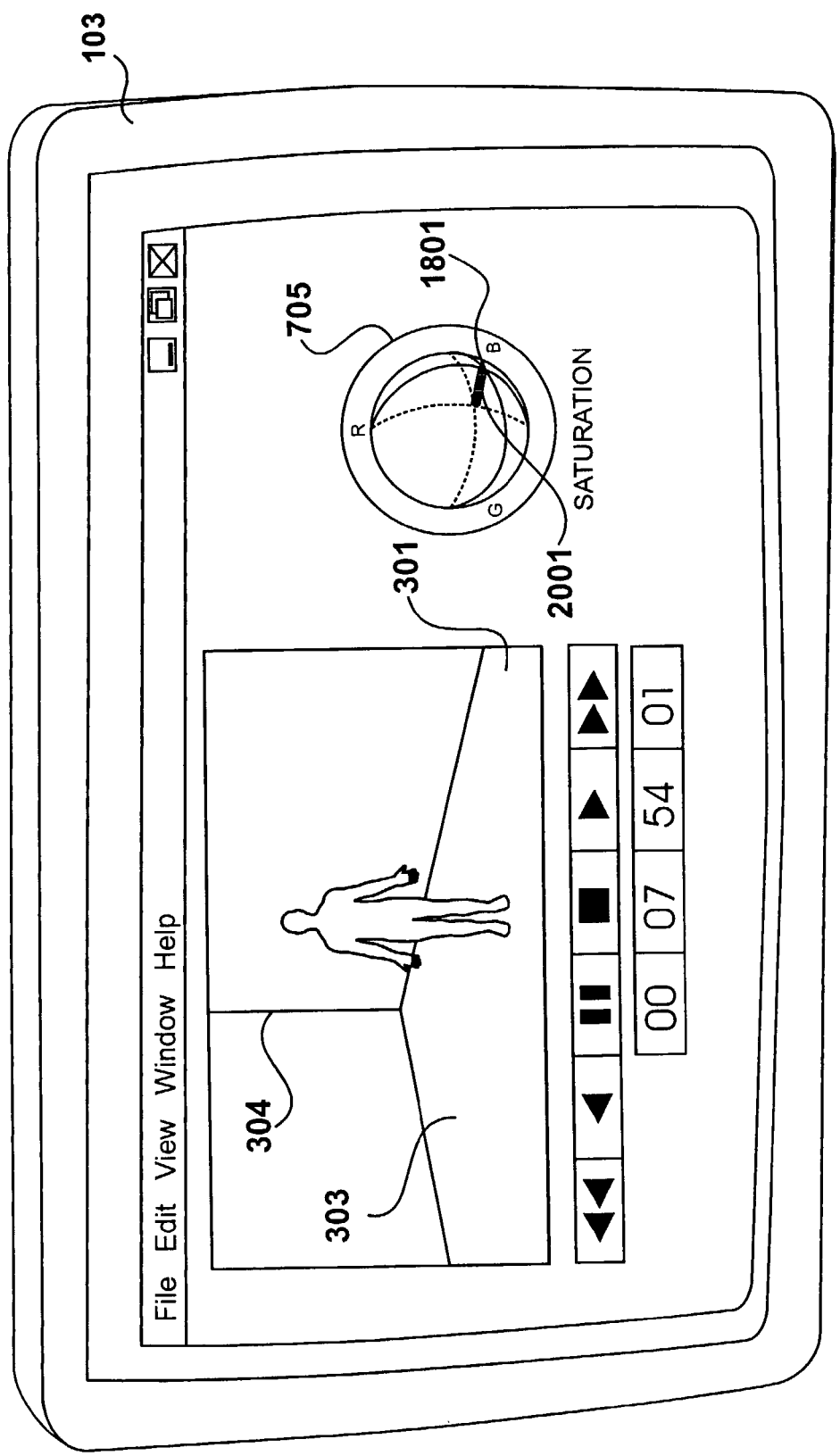
FIG. 20 shows the GUI of FIGS. 7 and 18, whereby further user input data is provided to further modify image data according to the present invention.

The GUI 701 of the compositing application 502 shown in FIGS. 7 and 18 is now shown in FIG. 20, wherein the user 101 of image processing system 102 inputs further colour component adjustments by mean of colour saturation widget 705 after question 1906 is answered positively.

In the example, user 101 determines that there still exists a colour component imbalance between the foreground image frame 301 and the proposed background image frame 305 to be composited therewith, notably because corner 304 is still too saturated in relation to talent 302. In order to successfully composite background image frame 305 within foreground image frame 301, it is desirable to further decrease the saturation of the "blue" colour to such an extent as to nullify the saturation, whereby said "blue" colour becomes a shade of grey. But user 101 must still retain the current saturation of the "green" and "red" colours such that talent 302 retains its original appearance in the frame.

According to the invention, user 101 can again intuitively interact with image processing system 102 to decrease the saturation of the "blue" colour component only within the colour components of image frame pixels representing the studio blue background in image frame 301 by moving the nominal neutral centre of widget 705 further towards the representation 1801 of the blue colour within said widget, by a further distance 2001.

The image processing 102 updates the RGB colour components of every pixel of image frame 301 within display area 702 in real time according to the invention.

Thus, the present invention provides a fast and resource-inexpensive apparatus and method for unidirectionally editing colour component values, for instance obtaining a colour-corrected foreground frame 302 within which the respective RGB colour components of the pixels representing the blue background of the studio set are uniform enough to remove the possibility of artefacts derived from light imbalance or talent lighting mismatch when compositing background image frame 305 therewith.

The invention claimed is:

1. A method of processing image data comprising storage means, processing means and display means, wherein said storage means is configured to store image data as picture screen elements having colour components and said processing means is configured to perform the steps of:
   generating a three-dimensional space representing a colour spectrum containing said colour components;
   initiating a plurality of three-dimensional space forward transformation matrices and at least one backward transformation matrix;
   concatenating said three-dimensional space transformation matrices to initiate a single three-dimensional space transformation matrix;
   populating said plurality of three-dimensional space transformation matrices in reply to user input data; and
   adjusting said image data by means of processing each of said colour components with said single three-dimensional space transformation matrix, wherein said backward transformation matrix omits the last forward transformation matrix applied.

2. A method according to claim 1, wherein said colour components are Red, Green and Blue colour components.

3. A method according to claim 1, wherein said three-dimensional space is a colour-space.

4. A method according to claim 1, wherein said plurality of three-dimensional space forward transformation matrices effect a rotation, scaling, translation or shearing or any combination thereof.

5. A method according to claim 1, wherein said plurality of three-dimensional space transformation matrices are linear four integers-by-four integers transformation matrices.

6. A method according to claim 1, wherein said user input data comprises two-dimensional directional data and distance data.

7. A method according to claim 6, wherein said populating step comprises the step of processing said directional data and distance data to update integers within said three-dimensional space transformation matrices.

8. A method according to claim 7, wherein said updating of integers within said three-dimensional space transformation matrices updates integers within said single transformation matrix by way of concatenation.

9. A method according to claim 1, wherein said image data is adjusted by means of multiplying the respective colour components of each picture screen element thereof by said single three-dimensional space transformation matrix.

10. Apparatus for processing image data comprising storage means, processing means and display means, wherein said storage means is configured to store image data as picture screen elements having colour components and said processing means is configured to perform the steps of:
    generating a three-dimensional space representing a colour spectrum containing said colour components;
    initiating a plurality of three-dimensional space forward transformation matrices and at least one backward transformation matrix;
    concatenating said three-dimensional space transformation matrices to initiate a single three-dimensional space transformation matrix;
    populating said plurality of three-dimensional space transformation matrices in reply to user input data; and
    adjusting said image data by means of processing each of said colour components with said single three-dimensional space transformation matrix, wherein said backward transformation matrix omits the last forward transformation matrix applied.

11. Apparatus according to claim 10, wherein said colour components are Red, Green and Blue colour components.

12. Apparatus according to claim 10, wherein said three-dimensional space is a colour-space.

13. A method according to claim 10, wherein said plurality of three-dimensional space forward transformation matrices effect a rotation, scaling, translation or shearing or any combination thereof.

14. A method according to claim 10, wherein said plurality of three-dimensional space transformation matrices are linear four integers-by-four integers transformation matrices.

15. A method according to claim 10, wherein said user input data comprises two-dimensional directional data and distance data.

16. A method according to claim 15, wherein said populating step comprises the step of processing said directional data and distance data to update integers within said three-dimensional space transformation matrices.

17. A method according to claim 16, wherein said updating of integers within said three-dimensional space transformation matrices updates integers within said single transformation matrix by way of concatenation.

18. A method according to claim 10, wherein said image data is adjusted by means of multiplying the respective colour components of each picture screen element thereof by said single three-dimensional space transformation matrix.

19. A computer system programmed to process image data, including storage means, processing means and display means, wherein said storage means is configured to store image data as picture screen elements having colour components and said processing means is programmed to perform the processing steps of:
    generating a three-dimensional space representing a colour spectrum containing said colour components;
    initiating a plurality of three-dimensional space forward transformation matrices and at least one backward transformation matrix;
    concatenating said three-dimensional space transformation matrices to initiate a single three-dimensional space transformation matrix;
    populating said plurality of three-dimensional space transformation matrices in reply to user input data; and
    adjusting said image data by means of processing each of said colour components with said single three-dimensional space transformation matrix, wherein said backward transformation matrix omits the last forward transformation matrix applied.

20. A computer system programmed to process image data according to claim 19, wherein said colour components are Red, Green and Blue colour components.

21. A computer system programmed to process image data according to claim 19, wherein said three-dimensional space is a colour-space.

22. A computer system programmed to process image data according to claim 19, wherein said plurality of three-dimensional space forward transformation matrices effect a rotation, scaling, translation or shearing or any combination thereof.

23. A computer system programmed to process image data according to any of claim 19, wherein said plurality of three-dimensional space transformation matrices are linear four integers-by-four integers transformation matrices.

24. A computer system programmed to process image data according to claim 19, wherein said user input data comprises two-dimensional directional data and distance data.

25. A computer system programmed to process image data according to claim 24, wherein said populating step comprises the step of processing said directional data and distance data to update integers within said three-dimensional space transformation matrices.

26. A computer system programmed to process image data according to claim 25, wherein said updating of integers within said three-dimensional space transformation matrices updates integers within said single transformation matrix by way of concatenation.

27. A computer system programmed to process image data according to claim 19, wherein said image data is adjusted by means of multiplying the respective colour components of each picture screen element thereof by said single three-dimensional space transformation matrix.

28. A computer readable medium having computer readable instructions executable by a computer, such that said computer performs the steps of:

storing image data as picture screen elements having colour components;

generating a three-dimensional space representing a colour spectrum containing said colour components;

initiating a plurality of three-dimensional space forward transformation matrices and at least one backward transformation matrix;

concatenating said three-dimensional space transformation matrices to initiate a single three-dimensional space transformation matrix;

populating said plurality of three-dimensional space transformation matrices in reply to user input data; and adjusting said image data by means of processing each of said colour components with said single three-dimensional space transformation matrix, wherein said backward transformation matrix omits the last forward transformation matrix applied.

* * * * *